(12) United States Patent
Kim et al.

(10) Patent No.: US 11,889,287 B2
(45) Date of Patent: Jan. 30, 2024

(54) ELECTRONIC DEVICE FOR MEASURING POSTURE OF USER AND METHOD THEREOF

(71) Applicant: Samsung Electronics Co., Ltd., Gyeonggi-do (KR)

(72) Inventors: Jinik Kim, Gyeonggi-do (KR); Namjoon Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 17/577,513

(22) Filed: Jan. 18, 2022

(65) Prior Publication Data

US 2022/0225054 A1    Jul. 14, 2022

Related U.S. Application Data

(63) Continuation of application No. PCT/KR2022/000564, filed on Jan. 12, 2022.

(30) Foreign Application Priority Data

Jan. 13, 2021    (KR) ......................... 10-2021-0004523

(51) Int. Cl.
*H04R 1/10* (2006.01)
*H04S 7/00* (2006.01)
(Continued)

(52) U.S. Cl.
CPC ............. *H04S 7/304* (2013.01); *H04R 5/033* (2013.01); *H04W 4/00* (2013.01); *H04S 2400/11* (2013.01)

(58) Field of Classification Search
CPC ...... H04S 7/304; H04S 2400/11; H04W 4/80; H04R 5/033
(Continued)

(56) References Cited

U.S. PATENT DOCUMENTS

| 7,536,029 B2 | 5/2009 | Choi et al. |
| 8,155,335 B2 | 4/2012 | Rutschman |

(Continued)

FOREIGN PATENT DOCUMENTS

| CN | 110568753 A | 12/2019 |
| KR | 10-0754385 B1 | 8/2007 |

(Continued)

OTHER PUBLICATIONS

International Search Report dated Apr. 22, 2022.
Written Opinion dated Apr. 22, 2022.

*Primary Examiner* — William J Deane, Jr.
(74) *Attorney, Agent, or Firm* — Cha & Reiter, LLC

(57) ABSTRACT

An electronic device according to an embodiment disclosed herein may include a sensor, a short-range communication module, and a processor. The processor is configured to generate first rotation angle information, establish a connection to the external electronic device, receive, from the external electronic device, second rotation angle information and check data uniquely assigned to the second rotation angle information, configure a first time stamp based on the check data and a time of receiving the second rotation angle information, configure a second time stamp based on the check data and a time of correcting the second rotation angle information, compare the first time stamp and the second time stamp to calculate a delay time, correct the second rotation angle information based on the delay time, and generate posture information based on the first rotation angle information and the corrected second rotation angle information.

20 Claims, 14 Drawing Sheets

(51) Int. Cl.
*H04R 5/033* (2006.01)
*H04W 4/00* (2018.01)

(58) Field of Classification Search
USPC .............. 381/23; 38/22; 702/141; 455/41.2
See application file for complete search history.

(56) References Cited

U.S. PATENT DOCUMENTS

| | | |
|---|---|---|
| 8,718,930 B2 | 5/2014 | Tachibana et al. |
| 10,102,666 B2 | 10/2018 | Parker et al. |
| 10,638,250 B2 | 4/2020 | Hammerschmidt |
| 2009/0052703 A1 | 2/2009 | Hammershoi |
| 2016/0036987 A1* | 2/2016 | Cartwright ............ H04M 3/568 |
| | | 381/17 |
| 2017/0064154 A1* | 3/2017 | Tseng ................. H04N 21/8547 |
| 2017/0075654 A1 | 3/2017 | Shin et al. |
| 2018/0213341 A1* | 7/2018 | Yang ..................... H04S 3/004 |
| 2019/0026067 A1 | 1/2019 | Baek et al. |
| 2020/0217917 A1 | 7/2020 | Ryu et al. |
| 2020/0233461 A1 | 7/2020 | Kim et al. |
| 2020/0359157 A1 | 11/2020 | Lyren et al. |
| 2020/0366990 A1 | 11/2020 | Goo |
| 2021/0006869 A1 | 1/2021 | Ferren et al. |
| 2021/0385606 A1* | 12/2021 | Chen ...................... H04S 7/304 |

FOREIGN PATENT DOCUMENTS

| | | |
|---|---|---|
| KR | 10-1117058 B1 | 2/2012 |
| KR | 10-1521363 B1 | 5/2015 |
| KR | 10-2017-0033025 A | 3/2017 |
| KR | 10-2017-0076181 A | 7/2017 |
| KR | 10-2020-0086120 A | 7/2020 |
| KR | 10-2020-0090438 A | 7/2020 |

\* cited by examiner

FIG. 5A
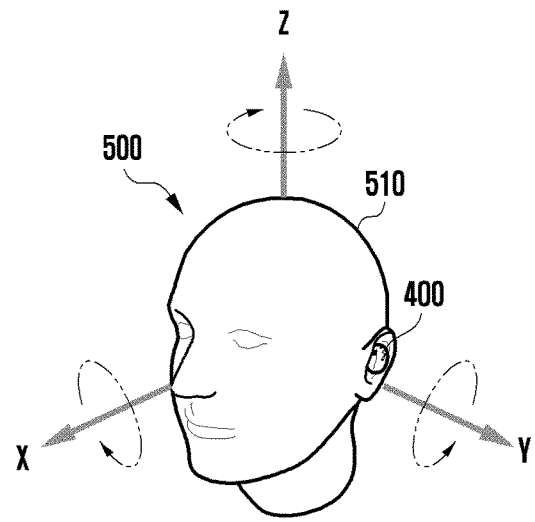
(a)
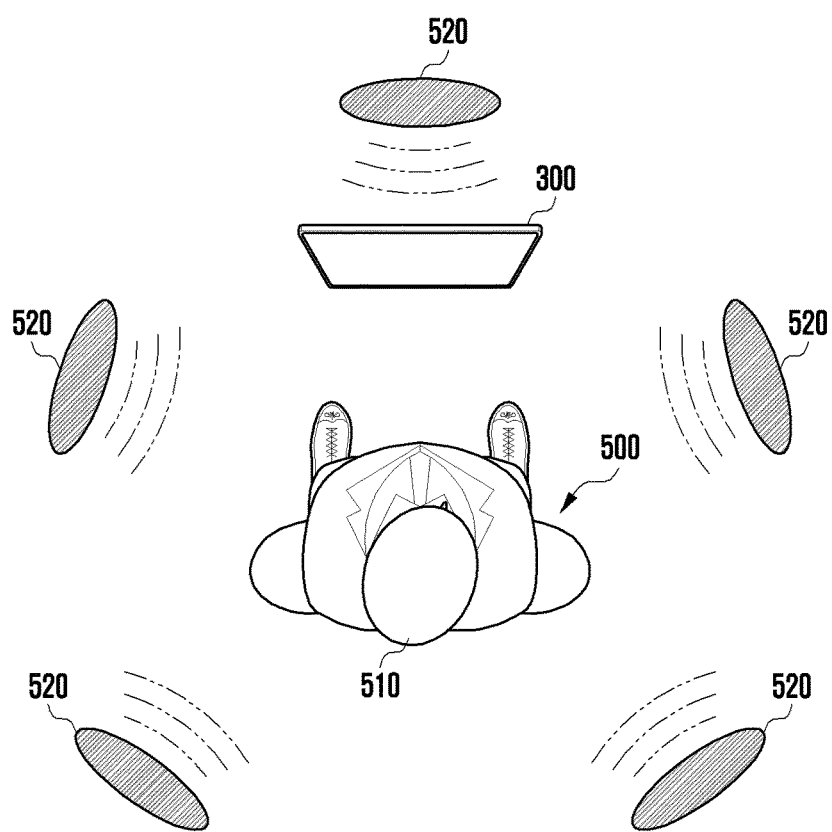
(b)

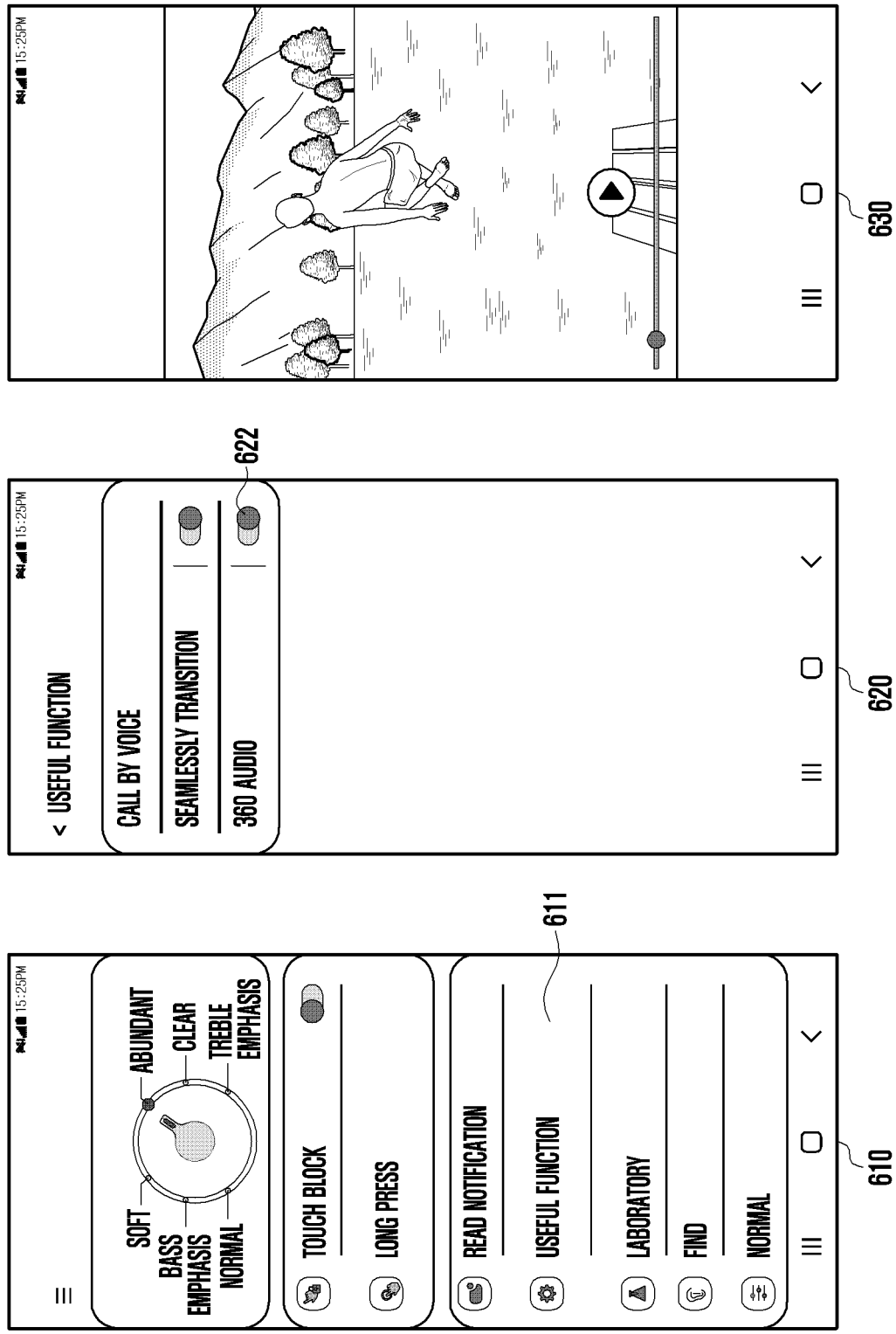

ELECTRONIC DEVICE FOR MEASURING POSTURE OF USER AND METHOD THEREOF

CROSS-REFERENCE TO RELATED APPLICATION(S)

This application is a continuation of International Application No. PCT/KR2022/000564, filed on Jan. 12, 2022, which claims priority to Korean Patent Application No. 10-2021-0004523, filed on Jan. 13, 2021 in the Korean Intellectual Property Office, the disclosures of which are herein incorporated by reference.

TECHNICAL FIELD

One or more embodiments disclosed herein generally relate to an electronic device and, for example, to technology for receiving sensor information from an external electronic device and generating user posture and movement information.

BACKGROUND ART

Wearable electronic devices that can be directly worn on human bodies have recently been developed. For example, wearable electronic devices may be configured such that they can be attached to/detached from parts of human bodies or clothes, as in the case of true wireless stereo (TWS) headphones and head-mounted devices (HMDs).

Stereophonic sound refers to a method for providing sound by using multiple sound output elements such that two or more independent sound channels are used. Audio data may include stereo sound information, and respective independent sound channels may be used such that multiple sound output elements output different sound, respectively, so that the listener hears a stereo sound image.

User position information or user posture information may be necessary to provide the user with proper spatial impression. A wearable device may be attached to a part of the user's body and used to measure the user's posture. However, when the wearable device and a cooperating electronic device are used to provide the user with the spatial impression, posture measurement may be delayed to some extent depending on the measurement process, communication status, or the like. Such a delay may make instantaneous responses to changes in the user's posture difficult.

SUMMARY

An electronic device according to an embodiment disclosed herein may include a sensor, a short-range communication module configured to perform short-distance communication with an external electronic device, and a processor operatively connected to the short-range communication module, wherein the processor is configured to generate first rotation angle information by using the sensor, establish a connection to the external electronic device by using the short-range communication module, receive, from the external electronic device, second rotation angle information and check data uniquely assigned to the second rotation angle information, configure a first time stamp based on the check data and a time of receiving the second rotation angle information, configure a second time stamp based on the check data and a time of correcting the second rotation angle information, compare the first time stamp and the second time stamp to calculate a delay time from the time of receiving the second rotation angle information to the time of correcting the second rotation angle information, correct the second rotation angle information based on the delay time, and generate posture information based on the first rotation angle information and the corrected second rotation angle information.

A method for providing three-dimensional sound by an electronic device according to an embodiment disclosed herein may include generating first rotation angle information, establishing a connection to an external electronic device, receiving second rotation angle information and check data uniquely assigned to the second rotation angle information from the external electronic device, configuring a first time stamp based on a time of receiving the second rotation angle information and the check data, configuring a second time stamp based on a time of correcting the second rotation angle information and the check data, comparing the first time stamp and the second time stamp to calculate a delay time from the time of receiving the second rotation angle information to the time of correcting the second rotation angle information, correcting second rotation angle information based on the delay time, and generating posture information based on the first rotation angle information and the corrected second rotation angle information.

An electronic device according to an embodiment disclosed herein may include a short-range communication module configured to perform short-distance communication with an external electronic device, a sensor for sensing a rotation angle of the electronic device, and a processor operatively connected to the short-range communication module and the sensor, wherein the processor is configured to generate rotation angle information regarding the rotation angle of the electronic device, by using the sensor, generate check data uniquely assigned to the rotation angle information in response to generating the rotation angle information, and transmit the rotation angle information and the check data to the external electronic device by using the short-range communication module.

Certain embodiments provide a method for predicting the user's head motion by using wearable electronic device sensor information, and changing the sound source according to the head movement in three-dimensional space by using the corresponding information. In addition, certain embodiments provide a method for optimizing posture information by predicting a user head movement pattern, in order to solve the problem of time delay of sensor posture information that is transferred wirelessly.

BRIEF DESCRIPTION OF DRAWINGS

In connection with the description of the drawings, the same or similar reference numerals may be used for the same or similar elements.

FIGS. 5A and 5B illustrate a three-dimensional sound service according to an embodiment;

FIG. 6 illustrates a user interface according to an embodiment;

DETAILED DESCRIPTION

Figure 1:
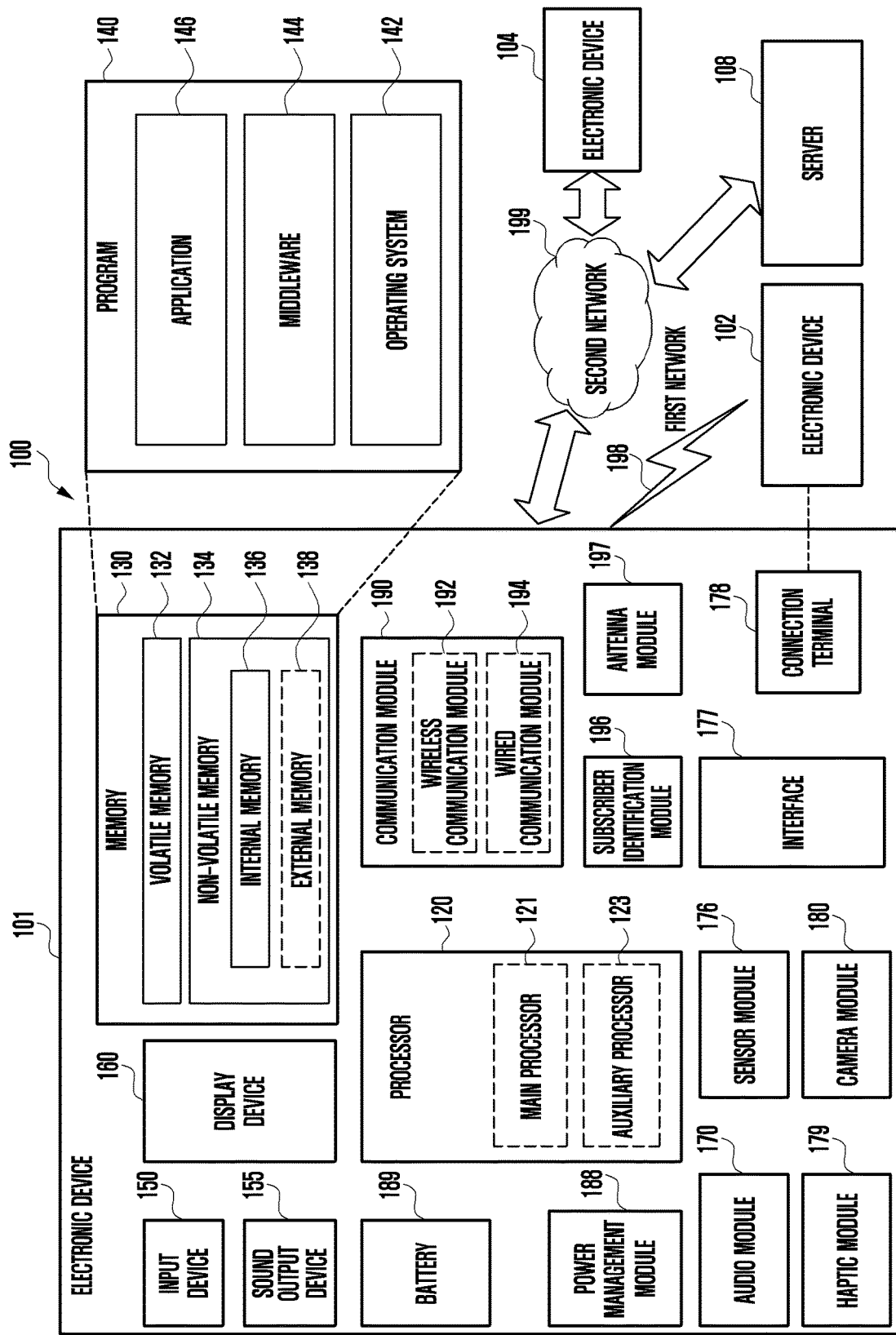
FIG. 1 is a block diagram illustrating an electronic device 101 in a network environment 100 according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1module 150, a sound output 1module 155, a display 1module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input 1module 150 may receive a command or data to be used by another component (e.g., the processor 120) of the electronic device 101, from the outside (e.g., a user) of the electronic device 101. The input 1module 150 may include, for example, a microphone, a mouse, a keyboard, a key (e.g., a button), or a digital pen (e.g., a stylus pen).

The sound output 1module 155 may output sound signals to the outside of the electronic device 101. The sound output 1module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1module 160 may visually provide information to the outside (e.g., a user) of the electronic device 101. The display 1module 160 may include, for example, a display, a hologram device, or a projector and control circuitry to control a corresponding one of the display, hologram device, and projector. According to an embodiment, the display 1module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1module 150, or output the sound via the sound output 1module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
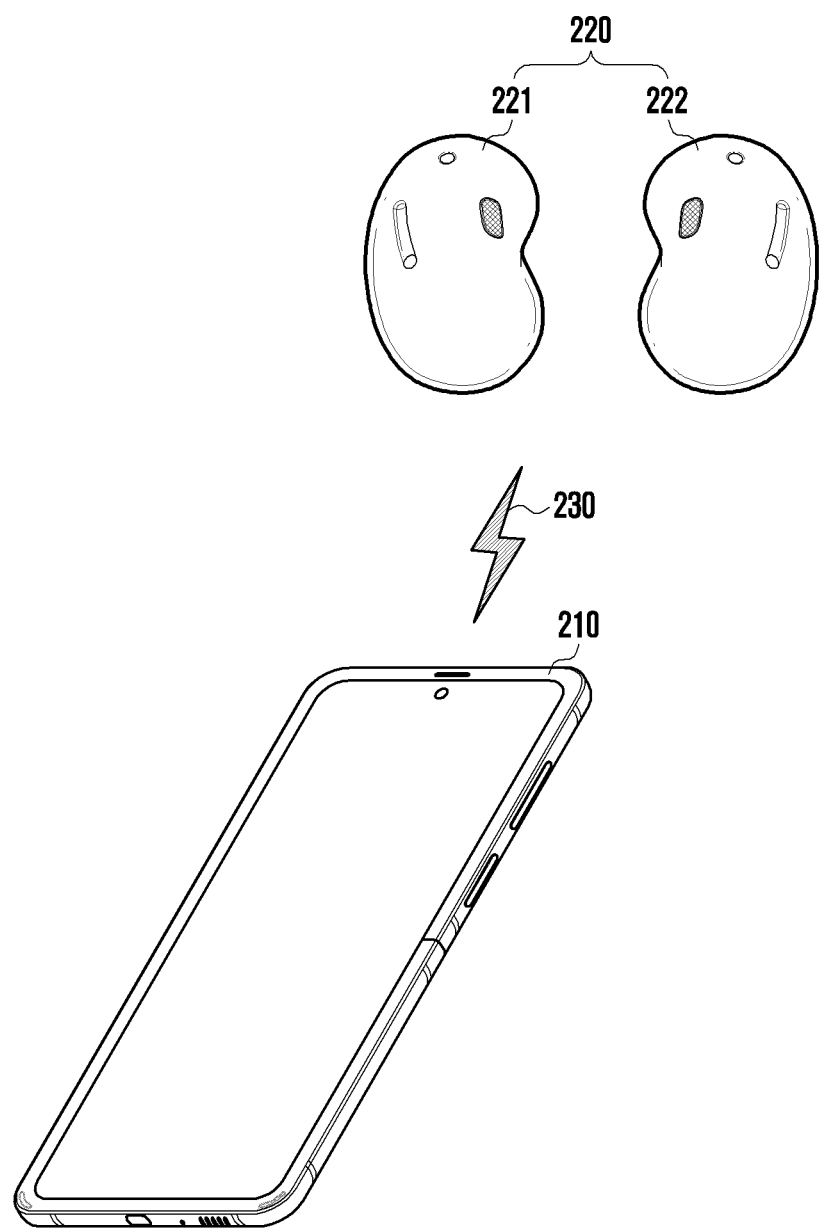
FIG. 2 illustrates an example in which an electronic device and a wearable device perform wireless communication connection according to an embodiment.

FIG. 2 illustrates an example in which an electronic device and a wearable device perform wireless communication connection according to an embodiment.

Referring to FIG. 2, an electronic device 210 and a wearable device 220 may be connected to each other using a wireless communication network 230.

According to an embodiment, the electronic device 210 may be a device for providing wireless communication. The electronic device 210 may be, for example, a smart phone, a PC, or a tablet PC, but is not limited to these examples. The electronic device 210 may include at least part of the configuration and/or functions of the electronic device 101 of FIG. 1. According to an embodiment, the electronic device 210 may provide a three-dimensional sound service to a user. The three-dimensional sound service may be understood as, for example, a sound service based on the user's posture information. According to an embodiment, the three-dimensional sound service may refer to a function of controlling the output of sound according to the user's posture. According to an embodiment, the electronic device 210 may receive information related to the user's posture from the wearable device 220 in order to provide the three-dimensional sound service. The information related to the user's posture may include, for example, sensor information sensed and/or detected by a sensor included in the wearable device 220 or information regarding a result calculated by using the sensor information by the wearable device 220. According to an embodiment, the information related to the user's posture may be information regarding the rotation angle of the wearable device 220. According to an embodiment, the electronic device 210 may estimate, detect, or calculate the user's actual posture by using the information related to the user's posture received from the wearable device 220. According to an embodiment, the electronic device 210 may generate posture information by using the rotation angle information received from the wearable device 220. According to an embodiment, the electronic device 210 may generate information related to the posture of the electronic device 210 (e.g., rotation angle information of the electronic device 210) via a sensor (e.g., the sensor 320 of FIG. 3) of the electronic device 210. According to an embodiment, the electronic device 210 may generate information (e.g., posture information) regarding the user's relative posture with respect to the electronic device 210 based on the information related to the posture of the electronic device 210 and the user's posture-related information (e.g., rotation angle information) received from the wearable device 220.

According to an embodiment, the electronic device 210 may transmit audio information to the wearable device 220 in order to provide the three-dimensional sound service. The audio information may be a voice signal or a signal obtained by digitizing the voice signal. According to an embodiment, the electronic device 210 may render audio information based on the user's posture-related information (e.g., posture information) in order to provide the three-dimensional sound service. Rendering may be understood as, for example, changing audio information based on the user's posture information generated by the electronic device 210. According to an embodiment, the electronic device 210 may transmit audio information rendered based on the user's posture information to the wearable device 220.

According to an embodiment, the wearable device 220 may be worn on a part of the user's body or may be attached or fixed to a part of clothes worn by the user. According to an embodiment, the wearable device 220 may include a first wearable device 221 and a second wearable device 222. According to an embodiment, the first wearable device 221 and the second wearable device 222 may be connected to each other using wireless communication. According to an embodiment, each of the first wearable device 221 and the second wearable device 222 may be connected to the electronic device 210 by using the wireless communication network 230, or only one of the first wearable device 221 and the second wearable device 220 may be wirelessly connected to the electronic device 210. According to an embodiment, the wearable device 220 may measure, detect, and/or sense information related to the posture of the user wearing the wearable device. According to an embodiment, the wearable device 220 may generate sensor information related to the posture of the wearable device 220 via a sensor (e.g., the sensor 420 of FIG. 4) included in the wearable device 220, and may calculate information (e.g., rotation angle information) related to the posture of the user wearing the wearable device 220 by using the sensor information. According to an embodiment, the wearable device 220 may transmit the generated and/or calculated user's posture-related information to the electronic device 210. According to an embodiment, the wearable device 220 may receive audio information from the electronic device 210 and may output sound based on the received audio information.

According to an embodiment, the electronic device 210 and the wearable device 220 may be connected to each other using the wireless communication network 230. The wireless communication network 230 may be, for example, a short-range wireless communication network (e.g., the first network 198 of FIG. 1). According to various embodiments, the electronic device 210 and the wearable device 220 may be connected to each other using at least one wireless communication scheme among Bluetooth, WiFi-P2P, Bluetooth low energy (BLE), and ultra-wide band (UWB). However, the wireless communication scheme is not limited to the above-described example. In certain embodiments disclosed herein, for convenience, an example in which the electronic device 210 and the wearable device 220 are connected using the Bluetooth scheme is described in a limited manner.

Figure 3:
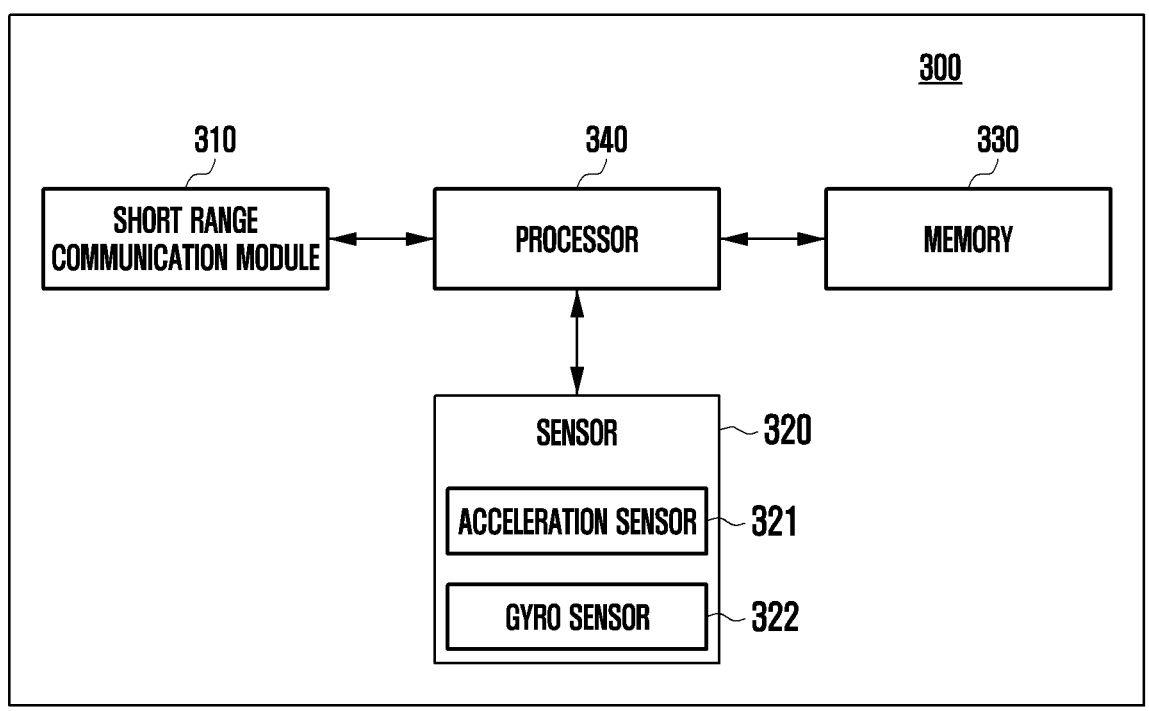
FIG. 3 is a block diagram of an electronic device according to an embodiment.

FIG. 3 is a block diagram of an electronic device according to an embodiment.

According to an embodiment, an electronic device 300 may include a short-range communication module 310, a sensor 320, a memory 330, and a processor 340. The electronic device 300 may include at least part of the configurations and/or functions included in the electronic device 101 of FIG. 1 and the electronic device 210 of FIG. 2.

According to an embodiment, the short-range communication module 310 may include a software and/or hardware module (e.g., a communication processor (CP)) for wirelessly communicating with a network (e.g., the wireless communication network 230 of FIG. 2) or an external electronic device (e.g., the wearable device 220 of FIG. 2), and may include at least part of the configuration and/or functions of the communication module 190 of FIG. 1. The short-range communication module 310 may be communicatively connected to the wearable device 220 through a short-range wireless communication network (e.g., the first network 198 of FIG. 1). According to an embodiment, the short-range communication module 310 may transmit data, which is provided from another element (e.g., the processor 340) of the electronic device 300, to an external electronic device, or may receive data from the external electronic device and provide the received data to the other element of the electronic device 300.

According to an embodiment, the sensor 320 may sense the movement of the electronic device 300. The sensor 320 may include at least part of the configuration and/or functions of the sensor module 176 of FIG. 1. According to an embodiment, the sensor 320 may sense a physical quantity related to the movement of the electronic device 300 including information related to the posture of the electronic device 300, such as the speed, acceleration, angular velocity, angular acceleration, and/or geographic location of the electronic device 300. According to an embodiment, the sensor 320 may at least include an acceleration sensor 321 and a gyro sensor 322. According to an embodiment, the sensor 320 may generate acceleration information of the electronic device 300 via the acceleration sensor 321. According to an embodiment, the sensor 320 may generate angular velocity information of the electronic device 300 via the gyro sensor 322. According to an embodiment, the sensor 320 may generate rotation angle information (e.g., first rotation angle information) of the electronic device 300 by using the acceleration information and the angular velocity information.

According to an embodiment, the memory 330 may store various pieces of data used by at least one element (e.g., the processor 340) of the electronic device 300, and may include at least part of the configuration and/or functions of the memory 130 of FIG. 1. According to an embodiment, the memory 330 may store instructions executed by the processor 340. For example, the memory 330 may store instructions for causing the processor 340 to provide the three-dimensional sound service. According to an embodiment, the memory 330 may temporarily or permanently store information (e.g., rotation angle information) required for the electronic device 300 to provide the three-dimensional sound service.

According to an embodiment, the processor 340 may process data within the electronic device 300, may control at least one other element related to a function of the electronic device 300, and may perform data processing and computation required to perform various functions. The processor 340 may include at least part of the configuration and/or functions of the processor 120 of FIG. 1. The processor 340 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function elements, unless the element is expressly recited using the phrase "means for." In addition, an artisan understands and appreciates that a "processor" or "microprocessor" may be hardware in the claimed disclosure. The processor 340 may be electrically and/or functionally connected to elements of the electronic device 300, such as the short-range communication module 310, the sensor 320, and/or the memory 330. According to an embodiment, there will be no limitations on the computation and data processing functions that the processor 340 can implement in the electronic device 300. However, embodiments disclosed herein are used to primarily describe the function of generating the user's posture information and rendering audio information based on the generated posture information in order to provide the three-dimensional sound service.

According to an embodiment, the processor 340 may generate first rotation angle information. The first rotation angle information may be, for example, information regarding the rotation angle of the electronic device 300 indicating the degree of rotation of the electronic device 300. According to an embodiment, the processor 340 may generate angular velocity information, acceleration information, and position information of the electronic device 300 by controlling the sensor 320, and may combine and/or compute the generated angular velocity information, acceleration information, and position information to generate rotation angle information (e.g., first rotation angle information) of the electronic device 300. The rotation angle information may be information indicating the degree at which the electronic device 300 rotates with reference to virtual three-dimensional coordinates. The rotation angle information may be expressed as an angle, and the virtual three-dimensional coordinates may be formed with reference to at least a partial area of the electronic device 300. The rotation angle information may include at least three types of rotation angles (e.g., R value, P value, and Y value) in order to specify rotation in three dimensions. According to an embodiment, the rotation angle information may include an X-axis rotation angle (roll, R value) with reference to the X-axis, a Y-axis rotation angle (pitch, P value) with reference to the Y-axis, and a Z-axis rotation angle (yaw, Y value) with reference to the Z-axis, and the three pieces of rotation angle information may be collected as one piece of rotation angle information (e.g., yaw-pitch-roll (YPR) information). According to an embodiment, the processor 340 may continuously and/or periodically generate the first rotation angle information.

According to an embodiment, the processor 340 may be connected to an external electronic device (e.g., the wearable device 220 of FIG. 2). The processor 340 may control the short-range communication module 310 to establish a wireless connection with the wearable device 220. The processor 340 may transmit a signal for controlling to establish and maintain the wireless connection with the wearable device 220 using the short-range communication module 310, and may continuously and/or periodically transmit or receive signals related to wireless connection control (e.g., a serial port profile (SPP) message) during wireless connection establishment and wireless connection performance.

According to an embodiment, the processor 340 may receive second rotation angle information and latency check data of the second rotation angle information. According to an embodiment, the processor 340 may receive, from the wearable device 220, information related to the posture of the wearable device 220, for example, second rotation angle information via the short-range communication module 310. The processor 340 may continuously and/or periodically receive information related to the posture of the wearable device 220, and may receive latency check data related to the sequence of the posture-related information substantially simultaneously or sequentially with the posture-related information periodically transmitted from the wearable device 220. According to an embodiment, the latency check data is information for identifying a time period of delay between receiving data (e.g., second rotation angle information) and then processing the received data (e.g., second rotation angle information). According to an embodiment, there is a possibility that a delay may occur depending on the actual system implementation, from the point in time when the electronic device 300 receives the second rotation angle information by using the short-range communication module 310 to the time when the second rotation angle information reaches a functional element (e.g., an application 860 of FIG. 8) configured to correct the received second rotation angle information. Alternatively, a delay may occur from the point in time when the second rotation angle information is received to the point in time when the processor 340 corrects the received second rotation angle information. In this case, latency check data may be used to identify the delay time that has occurred. According to an embodiment, the latency check data may be information for identifying a time delay taken for data transmission between two devices (e.g., the electronic device 300 and the wearable device 220). According to an embodiment, the latency check data may be information required to calculate a delay time taken for data from each functional element (e.g., a BT 850 in FIG. 8) of the electronic device 300 to reach another functional element (e.g., an application 860 in FIG. 8) thereof. For example, the latency check data may be unique information associated with specific data transmitted at a specific time point in the plurality of second rotation angle information transmitted in real time. The latency check data may be, for example, unique data relating to one data transmission unit (e.g., a packet) transmitted by the wearable device 220. According to an embodiment, the latency check data may be check data uniquely assigned to the second rotation angle information. According to an embodiment, the processor 340 may receive check data (e.g., latency check data) uniquely assigned to the second rotation angle information. When two predetermined packets include the identical latency check data, the processor 340 may recognize that the two packets include the same data. The information related to the posture of the wearable device 220 may be, for example, second rotation angle information, and the second rotation angle information may include information regarding the rotation angle (e.g., yaw-pitch-roll (YPR) information) with reference to the three-dimensional coordinates of the wearable device 220. The latency check data may be, for example, information (e.g., sequence information) regarding the sequence of signals and/or information transmitted by the wearable device 220 to the electronic device 300. According to an embodiment, the processor 340 may receive, from the wearable device 220, a signal (e.g., an SPP message) for controlling a wireless connection with the wearable device 220, a time stamp related to transmission, reception, or processing times of the SPP message, and YPR data (e.g., rotation angle information) and/or latency check data of the wearable device 220. The above data may be included in the same transmission unit (packet).

According to an embodiment, the processor 340 may configure a first time stamp and a second time stamp. The time stamp may be information of a recorded system time, such as when a wireless connection control signal (e.g., an SPP message) received from the wearable device 220 is transmitted to the electronic device 300, is transmitted to a functional element (e.g., an application 860 of FIG. 8) of the electronic device 300, or is processed in the functional element. The processor 340 may configure, change, or update the time stamp with respect to the same SPP message. The processor 340 may continuously receive the SPP message from the wearable device 220, and may configure a first time stamp in response to the time point at which the received SPP message is received by the short-range communication module 310. The processor 340 may temporarily or permanently store the configured first time stamp in the memory 330. According to an embodiment, the processor 340 may configure the first time stamp in response to the time of receiving the SPP message and the latency check data. The processor 340 may receive the SPP message when it is included in the same transmission unit as the rotation angle information (e.g., second rotation angle information) and latency check data of the wearable device 220, and may configure, at the time of receiving the SPP message or the time of receiving the second rotation angle information, the first time stamp in response to the corresponding message or latency check data included in the same packet as the corresponding second rotation angle information. According to an embodiment, the processor 340 may configure a second time stamp. The second time stamp may be, for example, a time stamp configured in response to latency check data and the time point for correction of the second rotation angle information. According to an embodiment, the processor 340 may correct the second rotation angle information received from the wearable device 220, and the correction of the second rotation angle may be performed after time period equal to a predetermined period of time (e.g., delay time) from the time of receiving the second rotation angle information. The delay time may differ depending on, for example, data processing speed of the processor 340, the configuration environment of the processor 340, the type of an application being executed by the processor 340, or the data processing mode of the processor 340. The processor 340 may configure the second time stamp at substantially the same time as the time of correcting the second rotation angle information, for example, immediately before the second rotation angle information is corrected.

According to an embodiment, the processor 340 may calculate the delay time. According to an embodiment, the first time stamp and the second time stamp configured by the processor 340 may be at different time points. For example, the first and second time stamps may be the reception time point and the correction time point, respectively, in response to receiving the second rotation angle information having latency check data. The processor 340 may calculate the delay time by using different first and second time stamps that correspond to the same latency check data. According to an embodiment, the processor 340 may calculate the delay time by using the difference between the second time stamp and the first time stamp. According to an embodiment, the delay time may refer to the difference from the time point at which the same second rotation angle information is received by the electronic device 300 to the time point at which the second rotation angle information is corrected.

According to an embodiment, the processor 340 may correct the second rotation angle information. According to an embodiment, the second rotation angle information may be information indicating rotation information of the wearable device 220. The rotation angle of the wearable device 220 may be in a state of being changed when the processor 340 receives and processes the second rotation angle information. The processor 340 may correct the second rotation angle information based on the calculated delay time. According to an embodiment, the processor 340 may continuously generate information regarding a variance in the previously received second rotation angle information (e.g., rotation angle variance information) when correcting the second rotation angle information. According to an embodiment, the processor 340 may calculate a correction value for the second rotation angle information based on the rotation angle variation information and the delay time, and may apply the calculated correction value to the received second rotation angle information to correct the second rotation angle information. According to an embodiment, the processor 340 may calculate a rotation direction of the wearable device 220 based on the second rotation angle information received from the wearable device 220. According to an embodiment, the processor 340 may calculate the rotation direction of the wearable device 220 and identify rotation-enabling range information, which is pre-stored in the memory 330, based on the rotation direction. The rotation-enabling range information may be, for example, a range of maximum rotatable angle corresponding to the rotation direction. Rotation of the wearable device 220 may be made by the movement of a body part (e.g., the head) of the user wearing the wearable device 220, and the movement of the user's body part (e.g., the head) exhibits different tendencies depending on the rotation direction. For example, with reference to the head of the user wearing the wearable device 220, the rotation-enabling range in the up and down directions may have a relatively small value compared to the rotation-enabling range in the left and right directions. According to an embodiment, the processor 340 may correct the second rotation angle information based on the identified rotation-enabling range information. According to an embodiment, the processor 340 may receive multiple short-range wireless signals (e.g., ultra-wide band (UWB) signals) output from multiple components (e.g., the first wearable device 221 and the second wearable device 222) of the wearable device 220, and may control the sensor 320 to measure distances from each component from which each of multiple short-range wireless signals are output. These distances may be, for example, the distances between each component from which the wearable device 220 outputs short-range wireless signals, to the electronic device 300. According to an embodiment, the processor 340 may measure the movement of the user's body part (e.g., the head) by using each measured distance values obtained by using short-range wireless signals, and may correct the second rotation angle information by using the difference between the movement measurement value of the user's body part (e.g., the head) and the second rotation angle information. According to an embodiment, the processor 340 may correct the second rotation angle information by using each measured distance.

According to an embodiment, the processor 340 may generate posture information. According to an embodiment, the posture information may be information related to a relative posture formed by the wearable device 220 with reference to the position and posture of the electronic device 300. The posture information may include, for example, the position and rotation angle information of the wearable device 220 with reference to the electronic device 300. According to an embodiment, the processor 340 may generate posture information based on the rotation angle information (e.g., first rotation angle information) of the electronic device 300 and rotation angle information (e.g., second rotation angle information) of the wearable device 220. According to an embodiment, the processor 340 may calculate a relative rotation angle of the wearable device 220 with respect to the electronic device 300 by using the first rotation angle information and the second rotation angle information, and may generate the calculated relative rotation angle as the posture information.

According to an embodiment, the processor 340 may render audio information based on the posture information and transmit the rendered audio information to an external electronic device (e.g., the wearable device 220 of FIG. 2). According to an embodiment, the processor 340 may render audio information based on the generated posture information. Rendering may refer to, for example, changing audio information based on the posture information generated by the processor 340. According to an embodiment, the three-dimensional sound service may refer to forming a virtual sound source, that is, a sound image that allows the listener to feel as if the sound source exists at a designated location when audio information is output by the wearable device 220. According to an embodiment, the processor 340 may render audio information together with information for adjusting the sound output based on the posture information, and may give the listener the effect that the sound source is located in a particular virtual location. According to an embodiment, the processor 340 may render audio information in order to give the listener, who receives the three-dimensional sound service through the wearable device 220, the effect that a sound image is to be formed at the electronic device 300 or at a designated location with respect to the electronic device 300. According to an embodiment, the processor 340 may transmit the rendered audio information to the wearable device 220.

According to an embodiment, the processor 340 may learn a pattern regarding the rotation direction of the wearable device 220. The pattern regarding the rotation direction may refer to, for example, the rotation direction of the wearable device 220, calculated in response to rotation angle information (e.g., second rotation angle information). According to an embodiment, the processor 340 may collect learning data, that is, information regarding a rotation state. According to an embodiment, the information regarding the rotation state may include a stationary state, a rotation state, a left/right rotation state, an up/down rotation state, or a combination thereof. The learning data may be, for example, information regarding various states of the user's head as a result of the rotation. According to an embodiment, the learning data may be information regarding rotation states pre-stored in the memory 330 or information calculated using rotation angle information (e.g., first rotation angle information or second rotation angle information). According to an embodiment, the processor 340 may store the collected learning data in at least a partial area of the memory 330.

According to an embodiment, the processor 340 may determine basic data. According to an embodiment, the processor 340 may determine basic data that serves as a basis for learning the rotation direction pattern. The basic data may be, for example, a sensor value of the wearable device 220, received from the wearable device 220. According to an embodiment, the processor 340 may receive an acceleration value generated by an acceleration sensor (e.g., the acceleration sensor 421 of FIG. 4) and an angular velocity value generated by a gyro sensor (e.g., the gyro sensor 422 of FIG. 4) of the wearable device 220 and store the same. The basic data determined by the processor 340 may include the acceleration value and angular velocity value of the wearable device 220. According to an embodiment, the basic data may include a pre-stored rotation-enabling range, a system environment of the electronic device 300, an operation mode of the processor 340, or a type of an application being executed by the processor 340.

According to an embodiment, the processor 340 may extract a feature value. According to an embodiment, the processor 340 may extract a vector direction, which serves as the feature value of a rotation direction pattern and rotation angle information (e.g., a second rotation angle information) of the wearable device 220, based on the acceleration value and the angular velocity value determined as basic data. According to an embodiment, the processor 340 may receive the second rotation angle information from the wearable device 220, and may store the received second rotation angle information as a feature value.

According to an embodiment, the processor 340 may learn the rotation direction based on the feature value. According to an embodiment, the processor 340 may learn the rotation direction based on the feature value extracted using an algorithm pre-stored in the memory 330 and the collected and stored learning data.

According to an embodiment, the processor 340 may classify the learning data, and may store, in the memory 330, information regarding the rotation direction based on the classified learning data. According to an embodiment, the processor 340 may correct the second rotation angle information based on the learned rotation direction data.

According to an embodiment, the processor 340 may use posture information in order to provide the three-dimensional sound service. According to an embodiment, when rendering the audio information, the processor 340 may render audio information based on the generated posture information, or may render the audio information based on a default value (stationary state) without using the posture information. According to an embodiment, the processor 340 may determine whether to provide the three-dimensional sound service or whether the three-dimensional sound service is required, by using the posture information.

According to an embodiment, the processor 340 may sense whether an external electronic device (e.g., the wearable device 400 of FIG. 4) is rotated. According to an embodiment, the posture information may be generated based on rotation angle information (e.g., first rotation angle information) of the electronic device 300 and rotation angle information (e.g., second rotation angle information) of the wearable device 400. According to an embodiment, when rotation of the wearable device 400 is sensed, the processor 340 may determine that the user's movement has occurred, and may determine that it is necessary to provide the three-dimensional sound service. According to an embodiment, when rotation of the wearable device 400 is sensed, the processor 340 may render audio information based on the posture information.

According to an embodiment, the processor 340 may sense whether the electronic device 300 is rotated. According to an embodiment, when the rotation of the electronic device 300 is sensed substantially simultaneously with the rotation of the wearable device 400, the processor 340 may determine that there is no need to provide the three-dimensional sound service. According to an embodiment, when the electronic device 300 rotates substantially simultaneously with the wearable device 400, the electronic device 300 may move together with the user and the wearable device 400. In this case, it may not be necessary to provide the three-dimensional sound service. Alternatively, when the rotation of the electronic device 300 occurs substantially simultaneously with the rotation of the wearable device 400, there is a risk that the three-dimensional sound service may cause confusion to the listener and thus, the processor 340 may not provide the three-dimensional sound service.

According to an embodiment, the processor 340 may render audio information based on the posture information. According to an embodiment, when the rotation of the wearable device 400 is sensed and when the rotation of the electronic device 300 is not sensed, the processor 340 may render audio information using the generated posture information.

According to an embodiment, the processor 340 may render audio information using a default value. According to an embodiment, when it is determined that the three-dimensional sound service is unnecessary, that is, when the rotation of the wearable device 400 is not sensed or when the rotation of the electronic device 300 occurs substantially simultaneously with the rotation of the wearable device 400, the processor 340 may render the audio information using the preset default value, and therefore not render the audio information based on the posture information.

Figure 4:
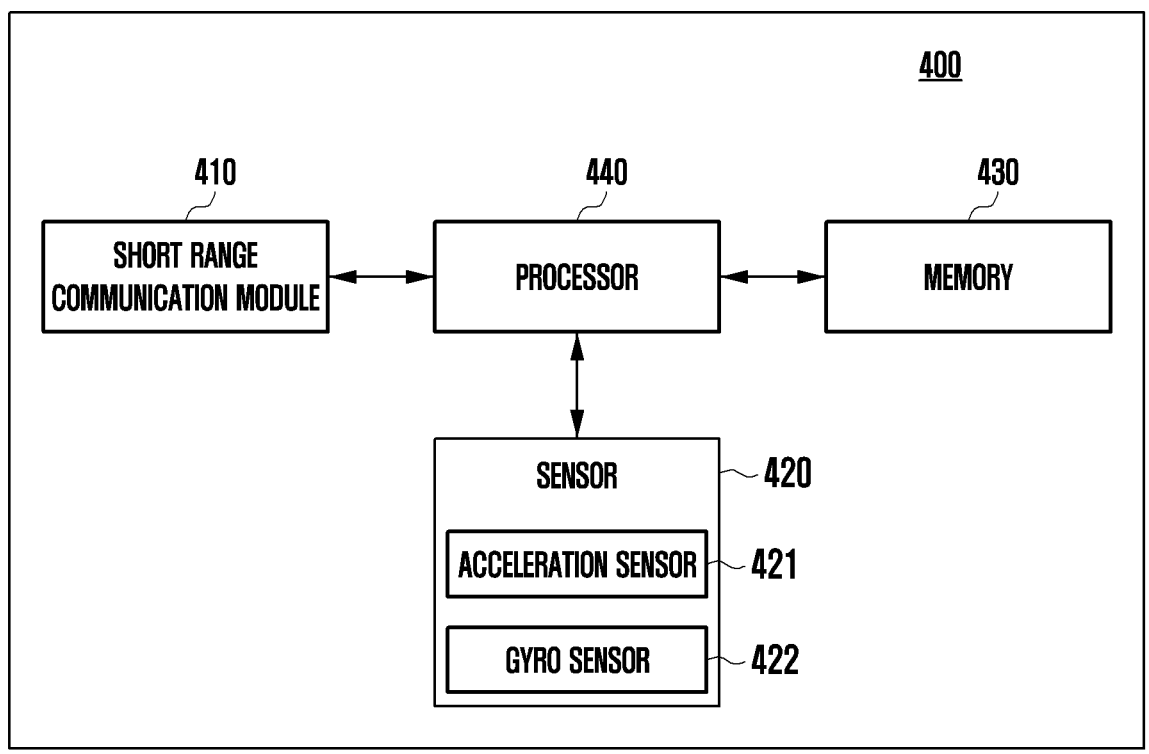
FIG. 4 is a block diagram of a wearable device according to an embodiment.

FIG. 4 is a block diagram of a wearable device according to an embodiment.

According to an embodiment, a wearable device 400 may include a short-range communication module 410, a sensor 420, a speaker 430, and a processor 440. The wearable device 400 may include at least part of the configuration and/or functions included in the electronic device 102 of FIG. 1 and the wearable device 220 of FIG. 2.

According to an embodiment, the short-range communication module 410 may include a software and/or a hardware module (e.g., a communication processor (CP)) for wirelessly communicating with a network (e.g., the wireless communication network 230 of FIG. 2) or an external electronic device (e.g., the electronic device 210 of FIG. 2). The communication module may be communicatively connected with an electronic device (e.g., the electronic device 210 of FIG. 2 or the electronic device 300 of FIG. 3) through a short-range wireless communication network (e.g., the first network 198 of FIG. 1). According to an embodiment, the short-range communication module 410 may transmit data provided from another element (e.g., the processor 440) of the wearable device 400 to an external electronic device (e.g., the electronic device 300 of FIG. 3), or may receive data from the external electronic device and provide the received data to other element of the wearable device 400.

According to an embodiment, the sensor 420 may sense the movement of the wearable device 400. According to an embodiment, the sensor 420 may sense a physical quantity, which is related to the movement of the wearable device 400 and includes information related to the posture of the wearable device 400, for example, the speed, acceleration, angular velocity, angular acceleration, and/or geographic location of the wearable device 400. According to an embodiment, the sensor 420 may at least include an acceleration sensor 421 and a gyro sensor 422. According to an embodiment, the sensor 420 may generate acceleration information of the wearable device 400 via the acceleration sensor 421. According to an embodiment, the sensor 420 may generate angular velocity information of the wearable device 400 via the gyro sensor 422. According to an embodiment, the sensor 420 may generate rotation angle information (e.g., second rotation angle information) of the wearable device 400 by using the acceleration information and the angular velocity information.

According to an embodiment, the speaker 430 may output audio information of the wearable device 400. The speaker 430 may convert the audio information from digital to analog and output the analog signal. According to an embodiment, the speaker 430 may output audio information received from the electronic device 300 under the control of the processor 440.

According to an embodiment, the processor 440 may process data within the wearable device 400, may control at least one other element related to a function of the wearable device 400, and may perform data processing and computation required to perform various functions. The processor 440 may be electrically and/or functionally connected to elements of the wearable device 400, such as the short-range communication module 410, the sensor 420, or the speaker 430. According to an embodiment, the processor 440 may not be limited to the computation and data processing functions that can be implemented in the wearable device 400. However, as disclosed herein, the function of generating and transmitting rotation angle information in order to provide the three-dimensional sound service and outputting audio information received from the electronic device 300 will be primarily described.

According to an embodiment, the processor 440 may generate second rotation angle information. The second rotation angle information may be, for example, information regarding the rotation angle of the wearable device 400 indicating the degree of rotation of the wearable device 400. According to an embodiment, the processor 440 may control the sensor 420 to generate angular velocity information, acceleration information, and/or position information of the wearable device 400, and may combine and/or compute the generated angular velocity information, acceleration information, and/or position information to generate rotation angle information (e.g., second rotation angle information) of the wearable device 400. The rotation angle information may be information indicating the degree at which the wearable device 400 rotates with reference to virtual three-dimensional coordinates. The rotation angle information may be expressed as an angle, and the virtual three-dimensional coordinates may be formed with reference to at least a partial area of the wearable device 400. The rotation angle information may include at least three types of rotation angles (e.g., R value, P value, and Y value) used to specify three dimensions. According to an embodiment, the rotation angle information may include an X-axis rotation angle (roll, R value) with reference to the X-axis, a Y-axis rotation angle (pitch, P value) with reference to the Y-axis, and a Z-axis rotation angle (yaw, Y value) with reference to the Z-axis, and three pieces of rotation angle information may be collected as one piece of rotation angle information (e.g., yaw-pitch-roll (YPR) information). According to an embodiment, the processor 440 may continuously and/or periodically generate the second rotation angle information.

According to an embodiment, the processor 440 may be connected to an external electronic device (e.g., the electronic device 300 of FIG. 3). The processor 440 may control the short-range communication module 410 to establish a wireless connection with the electronic device 300. The processor 440 may transmit a signal for controlling to establish and maintain the wireless connection with the electronic device 300 using the short-range communication module 410, and may continuously and/or periodically transmit or receive a signal related to wireless connection control (e.g., a serial port profile (SPP) message) during wireless connection establishment and wireless connection performance.

According to an embodiment, the processor 440 may generate second rotation angle information and latency check data of the second rotation angle information, and transmit the same to the electronic device 300. According to an embodiment, the processor 440 may transmit information related to the posture of the wearable device 400, for example, second rotation angle information, to the electronic device 300 by using the short-range communication module 410. The processor 440 may continuously and/or periodically transmit the posture-related information of the wearable device 400, and may generate latency check data related to the sequence of the posture-related information substantially simultaneously or sequentially with the posture-related information and transmit the same to the electronic device 300. According to an embodiment, the latency check data may be information used for identifying a delay time between the receiving of data (e.g., second rotation angle information) and the processing of the received data (e.g., second rotation angle information). According to an embodiment, there is a possibility that a delay may occur depending on the actual system implementation, from the point in time when the electronic device 300 receives the second rotation angle information by using the short-range communication module 310 to the point in time when the second rotation angle information reaches a functional element (e.g., an application 860 of FIG. 8) configured to correct the received second rotation angle information. Alternatively, a delay time may occur from the point in time when the second rotation angle information is received to the point in time when the processor 340 of the electronic device 300 corrects the received second rotation angle information. In this case, latency check data may be used to identify the delay time that has occurred. According to an embodiment, the latency check data may be information for identifying a time delay consumed for data transmission between two devices (e.g., the electronic device 300 and the wearable device 400). According to an embodiment, the latency check data may be information required to calculate a delay time taken for data from each functional element (e.g., a BT 850 in FIG. 8) of the electronic device 300 to reach another functional element (e.g., an application 860 in FIG. 8) thereof. For example, the latency check data may be unique information associated with specific data transmitted at a specific time point in the plurality of second rotation angle information transmitted in real time. The latency check data may be, for example, unique data relating to one data transmission unit (e.g., a packet) transmitted by the wearable device 400. According to an embodiment, the latency check data may be check data uniquely assigned to the second rotation angle information. According to an embodiment, the processor 340 may receive check data (e.g., latency check data) uniquely assigned to the second rotation angle information. With regard to a predetermined packet, unique latency check data may be included therein. The information related to the posture of the wearable device 400 may be, for example, second rotation angle information, and the second rotation angle information may include information regarding the rotation angle (e.g., yaw-pitch-roll (YPR) information) with reference to the three-dimensional coordinates of the wearable device 400. The latency check data may be, for example, information (e.g., sequence information) regarding the sequence of information and/or signal transmitted by the processor 440 to the electronic device 300. According to an embodiment, the processor 440 may transmit, to the electronic device, a signal (e.g., an SPP message) for controlling a wireless connection with the electronic device 300, a time stamp related to transmission, reception, or processing times of the SPP message, and YPR data (e.g., rotation angle information) and/or latency check data of the wearable device 400. The above data may be included in the same transmission unit (packet).

Figure 5B:
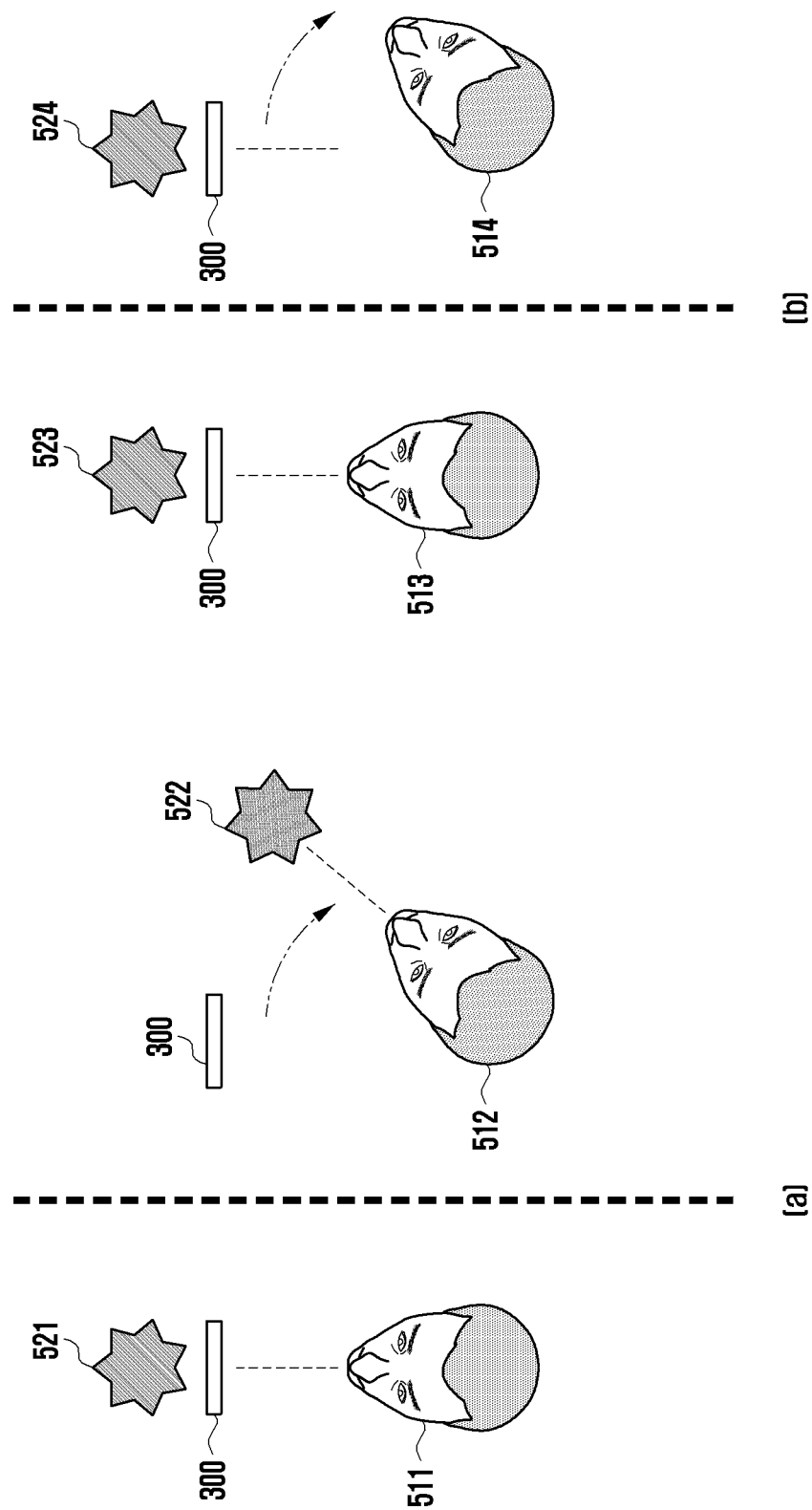

FIGS. 5A and 5B illustrate a three-dimensional sound service according to an embodiment.

FIG. 6 illustrates a user interface according to an embodiment.

Referring to [a] of FIG. 5A, information related to the posture of the user 500 may be expressed as rotation angle information (e.g., second rotation angle information) of the wearable device 400. According to an embodiment, the electronic device 300 may use information related to the posture of the user 500 in order to provide the three-dimensional sound service. The information related to the posture of the user 500 may require only information regarding the movement of the user's head 510, and the wearable device 400 may sense a physical quantity (e.g., acceleration and angular velocity) generated or changed according to the movement of the user's head 510. The movement of the user's head 510 may be expressed as a rotation angle using three-dimensional coordinates. According to an embodiment, the wearable device 400 may generate second rotation angle information. The second rotation angle information may be, for example, information regarding the rotation angle of the wearable device 400 indicating the degree of rotation of the wearable device 400. The rotation angle information may be information indicating the degree at which the wearable device 400 or the user's head 510 rotates with reference to virtual three-dimensional coordinates. The rotation angle information may be expressed as an angle, and the virtual three-dimensional coordinates may be formed with reference to at least a partial area of the wearable device 400 or at least a partial area of the user's head 510 wearing the wearable device 400. The rotation angle information may include at least three types of rotation angles (e.g., R value, P value, and Y value) configuring three dimensions. According to an embodiment, the rotation angle information may include an X-axis rotation angle (roll, R value) with reference to the X-axis, a Y-axis rotation angle (pitch, P value) with reference to the Y-axis, and a Z-axis rotation angle (yaw, Y value) with reference to the Z-axis, and three pieces of rotation angle information may be expressed together as one piece of rotation angle information (e.g., yaw-pitch-roll (YPR) information).

Referring to [b] of FIG. 5A, the electronic device 300 may provide a three-dimensional sound service to the user 500. The three-dimensional sound service may refer to the function of outputting sound based on the posture information of the user 500. According to an embodiment, the posture information may be generated based on the posture of the user 500 and the posture of the electronic device 300. The posture of the user 500 may include, for example, information regarding the rotation angle of the user's head 510. According to an embodiment, the posture information may be information regarding a posture formed by the user's head 510 with reference to the position of the electronic device 300 and/or the rotation angle of the electronic device 300. According to an embodiment, the three-dimensional sound service may refer to forming a virtual sound source, that is, a sound image that allows the listener (i.e. the user 500) to feel as if a sound source exists at a designated location when audio information is output by the wearable device 400. According to an embodiment, the electronic device 300 may render audio information together with information for adjusting the sound output based on the posture information, and may give the listener the effect that the virtual sound sources 520 are located in a designated virtual location. According to an embodiment, multiple virtual sound sources 520 may exist, and the electronic device 300 may control the wearable device 400 to render audio information based on information (e.g., posture information) related to the movement of the user's head 510 so that the virtual sound sources 520 are felt as if they exist at predetermined locations.

Referring to FIG. 5B, the three-dimensional sound service may be described based on the location of the virtual sound sources 520 and the corresponding sound image. Referring to [a] of FIG. 5B, a conventional example in which the three-dimensional sound service is not provided is described. For example, the case [a] of FIG. 5B may describe a conventional sound service. When the three-dimensional sound service is not provided, that is, when rendering of audio information using posture information is not performed and the user's head 510 is rotated from a first posture 511 to a second posture 512, the sound image can be rotated from the first sound image 521 to the second sound image 522.

Referring to [b] of FIG. 5B, the effect of the electronic device 300 providing a three-dimensional sound service may be described. According to an embodiment, when the user's head 510 is rotated from a third posture 513 to a fourth posture 514, a change may occur in the posture information. Even in the case in which the posture information is changed during formation of a third sound image 523, the electronic device 300 may form a fourth sound image 524 at the same position with respect to the electronic device 300. In this case, it is possible to generate the effect in which the position of the sound image is relatively changed with respect to the user.

Referring to FIG. 6, FIG. 6 may illustrate a user interface (UI) for execution of a three-dimensional sound service. According to an embodiment, the electronic device (e.g., the electronic device 101 of FIG. 1, the electronic device 210 of FIG. 2, and/or the electronic device 300 of FIG. 3) may provide a three-dimensional sound service function using an application stored in a memory (e.g., the memory 330). The application providing the three-dimensional sound service may include, for example, instructions causing the processor (e.g., the processor 340 of FIG. 3) to provide the three-dimensional sound service, and may include a user interface 610 for execution of a three-dimensional sound service function. For example, the user interface 610 may include a function menu (e.g., a "useful function" menu button 611) for execution of the three-dimensional sound service function. According to an embodiment, the application providing the three-dimensional sound service may include a user interface 620 for activating the function for the three-dimensional sound service, and a visual object (e.g., a button) 622 for activating the three-dimensional sound service function. According to an embodiment, when the three-dimensional sound service function is activated, the electronic device (e.g., the electronic device 300 of FIG. 3) may provide three-dimensional sound while performing various functions (e.g., video playback 630) supporting the sound service.

Figure 7:
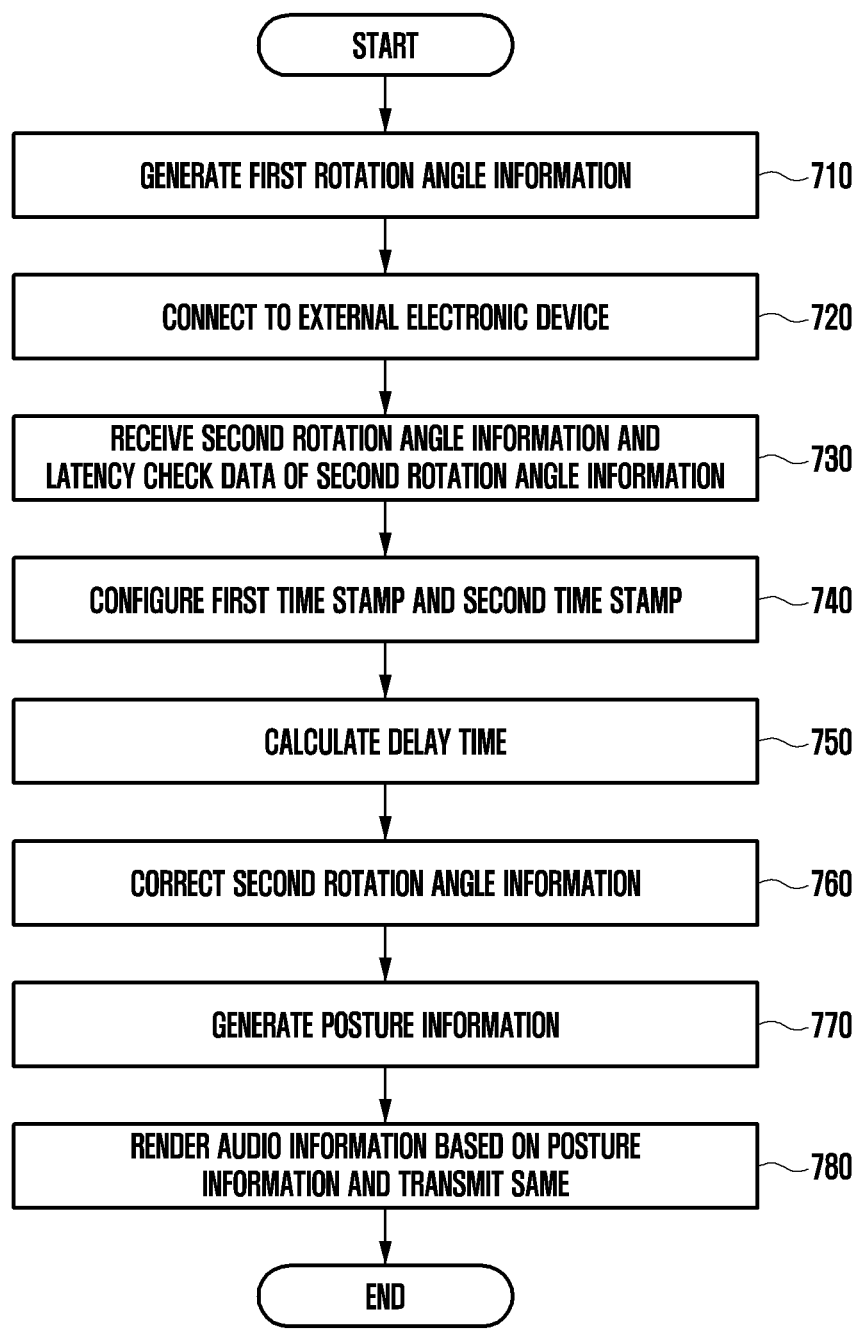
FIG. 7 is a flowchart illustrating an operation in which an electronic device generates posture information according to an embodiment.

FIG. 7 is a flowchart illustrating an operation of an electronic device for generating posture information according to an embodiment.

The operation of generating posture information by an electronic device (e.g., the electronic device 300 of FIG. 3) may be described as an operation of a processor (e.g., the processor 340 of FIG. 3) included in the electronic device 300.

Referring to operation 710, the processor 340 may generate first rotation angle information. The first rotation angle information may be, for example, information regarding the rotation angle of the electronic device 300, indicating the degree of rotation of the electronic device 300. According to an embodiment, the processor 340 may generate angular velocity information, acceleration information, and/or position information of the electronic device 300 by controlling the sensor (e.g., the sensor 320 of FIG. 3), and may combine and/or compute the generated angular velocity information, acceleration information, and/or position information to generate rotation angle information (e.g., first rotation angle information) of the electronic device 300. The rotation angle information may be information indicating the degree at which the electronic device 300 rotates with reference to virtual three-dimensional coordinates. The rotation angle information may be expressed as an angle, and the virtual three-dimensional coordinates may be formed with reference to at least a partial area of the electronic device 300. The rotation angle information may include at least three types of rotation angles (e.g., R value, P value, and Y value) configuring three dimensions. According to an embodiment, the rotation angle information may include an X-axis rotation angle (roll, R value) with reference to the X-axis, a Y-axis rotation angle (pitch, P value) with reference to the Y-axis, and a Z-axis rotation angle (yaw, Y value) with reference to the Z-axis, and three pieces of rotation angle information may be expressed as one piece of rotation angle information (e.g., yaw-pitch-roll (YPR) information). According to an embodiment, the processor 340 may continuously and/or periodically generate the first rotation angle information.

Referring to operation 720, the processor 340 may be connected to an external electronic device (e.g., the wearable device 220 of FIG. 2 and/or the wearable device 400 of FIG. 4). The processor 340 may control a short-range communication module (e.g., the short-range communication module 310) to establish a wireless connection with the wearable device 400. The processor 340 may transmit a signal for controlling to establish and maintain the wireless connection with the wearable device 400 using the short-range communication module 310, and may continuously and/or periodically transmit or receive a signal related to wireless connection control (e.g., a serial port profile (SPP) message) during wireless connection establishment and wireless connection performance.

Referring to operation 730, the processor 340 may receive second rotation angle information and latency check data of the second rotation angle information. According to an embodiment, the processor 340 may receive, from the wearable device 400, information related to the posture of the wearable device 400, for example, second rotation angle information via the short-range communication module 310. The processor 340 may continuously and/or periodically receive information related to the posture of the wearable device 400, and may receive latency check data related to the sequence of the posture-related information substantially simultaneously or sequentially with the posture-related information periodically transmitted from the wearable device 400. According to an embodiment, the latency check data is information for identifying a delay time between receiving data (e.g., second rotation angle information) and then processing the received data (e.g., second rotation angle information). According to an embodiment, there is a possibility that a delay may occur depending on the actual system implementation, from the point in time when the electronic device 300 receives the second rotation angle information by using the short-range communication module 310 to the time when the second rotation angle information reaches a functional element (e.g., an application 860 of FIG. 8) configured to correct the received second rotation angle information. Alternatively, a delay time may occur from the point in time when the second rotation angle information is received to the point in time when the processor 340 corrects the received second rotation angle information. In this case, latency check data may be used to identify the delay time that has occurred. According to an embodiment, the latency check data may be information for identifying a time delay taken for data transmission between two devices (e.g., the electronic device 300 and the wearable device 400). According to an embodiment, the latency check data may be information required to calculate a delay time taken for data from each functional element (e.g., a BT 850 in FIG. 8) of the electronic device 300 to reach another functional element (e.g., an application 860 in FIG. 8)

thereof. For example, the latency check data may be unique information associated with specific data transmitted at a specific time point in the plurality of the second rotation angle information transmitted in real time. The latency check data may be, for example, unique data relating to one data transmission unit (e.g., a packet) transmitted by the wearable device 400. According to an embodiment, the latency check data may be check data uniquely assigned to the second rotation angle information. According to an embodiment, the processor 340 may receive check data (e.g., latency check data) uniquely assigned to the second rotation angle information. When two predetermined packets include the identical latency check data, the processor 340 may recognize that the two packets include the same data. The information related to the posture of the wearable device 400 may be, for example, second rotation angle information, and the second rotation angle information may include information regarding the rotation angle with reference to the three-dimensional coordinates of the wearable device 400 (e.g., yaw-pitch-roll (YPR) information). The latency check data may be, for example, information (e.g., sequence information) regarding the sequence of signals and/or information transmitted by the wearable device 400 to the electronic device 300. According to an embodiment, the processor 340 may receive, from the wearable device 400, a signal (e.g., an SPP message) for controlling a wireless connection with the wearable device 400, a time stamp related to transmission, reception, or processing times of the SPP message, and YPR data (e.g., rotation angle information) and/or latency check data of the wearable device 400. The above data may be included in the same transmission unit (packet).

Referring to operation 740, the processor 340 may configure a first time stamp and a second time stamp. The time stamp may be information of a recorded system time of, for example, when a wireless connection control signal (e.g., an SPP message) received from the wearable device 400 is transmitted to the electronic device 300, is transmitted to a functional element (e.g., an APP 860 of FIG. 8) of the electronic device 300, or is processed in the functional element. The processor 340 may configure, change, or update a time stamp with respect to the same SPP message. The processor 340 may continuously receive the SPP message from the wearable device 400, and may configure the first time stamp in response to the time point at which the received SPP message is received by the short-range communication module 310. The processor 340 may temporarily or permanently store the configured first time stamp in the memory (e.g., the memory 330 of FIG. 3). According to an embodiment, the processor 340 may configure the first time stamp based on the time of receiving the SPP message and the latency check data. The processor 340 may receive the SPP message when it is included in the same transmission unit as the rotation angle information (e.g., second rotation angle information) and latency check data of the wearable device 400, and may configure, at the time of receiving the SPP message or the time of receiving the second rotation angle information, the first time stamp in response to the latency check data being included in the same packet as the corresponding message or the corresponding second rotation angle information. According to an embodiment, the processor 340 may configure a second time stamp. The second time stamp may be, for example, a time stamp configured based on the latency check data and the time point for correction of the second rotation angle information. According to an embodiment, the processor 340 may correct the second rotation angle information received from the wearable device 400, and the correction of the second rotation angle may be performed when a predetermined period of time (e.g., a delay time) from the time of receiving the second rotation angle information has elapsed. The delay time may differ depending on, for example, the data processing speed of the processor 340, the configuration environment of the processor 340, the type of an application being executed by the processor 340, or the data processing mode of the processor 340. The processor 340 may configure the second time stamp at substantially the same time as the time of correcting the second rotation angle information, for example, immediately before the second rotation angle information is corrected.

Referring to operation 750, the processor 340 may calculate the delay time. According to an embodiment, the first time stamp and the second time stamp configured by the processor 340 may be at different time points. For example, the first and second time stamps may be the reception time and the correction time, respectively, in response to receiving the second rotation angle information having latency check data. The processor 340 may calculate the delay time by using different first and second time stamps that correspond to the same latency check data. According to an embodiment, the processor 340 may calculate the delay time by using the difference between the second time stamp and the first time stamp. According to an embodiment, the delay time may refer to the difference from the time point at which the same second rotation angle information is received by the electronic device 300 to the time point at which the second rotation angle information is corrected.

Referring to operation 760, the processor 340 may correct the second rotation angle information. According to an embodiment, the second rotation angle information may be information indicating rotation information of the wearable device 400. The rotation angle of the wearable device 400 may be changed at the time point at which the processor 340 receives and processes the second rotation angle information. The processor 340 may correct the second rotation angle information based on the calculated delay time. According to an embodiment, the processor 340 may continuously generate information regarding a variance in the previously received second rotation angle information (e.g., rotation angle variance information) at the time of correcting the second rotation angle information. According to an embodiment, the processor 340 may calculate a correction value for the second rotation angle information based on the rotation angle variation information and the delay time, and may apply the calculated correction value to the received second rotation angle information to correct the second rotation angle information. According to an embodiment, the processor 340 may correct the second rotation angle information using Equations 1 and 2. Referring to Equations 1 and 2, $\Psi_k$ may represent corrected second rotation angle information, and $\Psi_{k-1}$ may represent previously corrected second rotation angle information. For example, $\Psi_k$ may be k-th corrected second rotation angle information, $\Psi_{k-1}$ may be (k−1)th corrected second rotation angle information, and $\Psi_0$ may be second rotation angle information before correction. In addition, $\Delta_{\Psi_\omega}$ may represent the rotation angle variance information, and $delay_{latency}$ may represent the delay time. Referring to Equations 1 and 2, the final correction value of the second rotation angle information may be calculated based on the previous correction value and the current delay time.

$$\Psi_k = \Psi_{k-1} + \Delta_\omega\Psi \times delay_{latency} \quad \ldots \quad |\Delta_\omega\Psi| > 0 \qquad \text{[Equation 1]}$$

$$\Psi_k = \Psi_{k-1} - \Delta_\omega\Psi \times delay_{latency} \quad \ldots \quad |\Delta_\omega\Psi| = 0 \qquad \text{[Equation 2]}$$

Referring to Equation 1, when the variance value in the rotation angle is not 0, for example, when the rotation angle changes, the second rotation angle information may be corrected by adding the variance in the rotation angle corresponding to the delay time to the second rotation angle information.

Referring to Equation 2, when the rotation angle is no longer changed, such as in the case when correction has already been made by further adding the rotation angle corresponding to the delay time. In this case, the second rotation angle information may be corrected by subtracting the variance in the rotation angle corresponding to the delay time from the second rotation angle information.

According to an embodiment, the processor 340 may calculate the rotation direction of the wearable device 400 based on the second rotation angle information received from the wearable device 400. According to an embodiment, the processor 340 may calculate a rotation direction of the wearable device 400 and identify rotation-enabling range information, which is pre-stored in the memory 330, based on the rotation direction. The rotation-enabling range information may be, for example, a range of a maximum rotatable angle corresponding to the rotation direction. Rotation of the wearable device 400 may be made by the movement of the head of the user wearing the wearable device 400, and the movement of the user's head exhibits different tendencies depending on the rotation direction. For example, with reference to the head of the user wearing the wearable device 400, the rotation-enabling range in the up and down directions may have a relatively small value compared to the rotation-enabling range in the left and right directions. According to an embodiment, the processor 340 may correct the second rotation angle information based on the identified rotation-enabling range information. According to an embodiment, the processor 340 may receive multiple short-range wireless signals (e.g., ultra-wide band (UWB) signals) output from various components (e.g., the first wearable device 221 and the second wearable device 222) of the wearable device 400, and may control the sensor 320 to measure distances from each component from which each of multiple short-range wireless signals are output. These distances may refer to, for example, the distances between each component from which the wearable device 220 outputs short-range wireless signals, to the electronic device 300. According to an embodiment, the processor 340 may measure the movement of the user's body part (e.g., the head) by using each measured distance values using short-range wireless signals, and may correct the second rotation angle information by using the difference between the movement measurement value of the user's body part (e.g., the head) and the second rotation angle information. According to an embodiment, the processor 340 may correct the second rotation angle information by using each measured distance.

Referring to operation 770, the processor 340 may generate posture information. According to an embodiment, the posture information may be information related to a relative posture formed by the wearable device 400 with reference to the position and posture of the electronic device 300. The posture information may include, for example, the position and rotation angle information of the wearable device 400 with reference to the electronic device 300. According to an embodiment, the processor 340 may generate posture information based on the rotation angle information (e.g., first rotation angle information) of the electronic device 300 and rotation angle information (e.g., second rotation angle information) of the wearable device 400. According to an embodiment, the processor 340 may calculate a relative rotation angle of the wearable device 400 with respect to the electronic device 300 by using the first rotation angle information and the second rotation angle information, and may generate the calculated relative rotation angle as the posture information.

Referring to operation 780, the processor 340 may render audio information based on the posture information and transmit the rendered audio information to an external electronic device (e.g., the wearable device 400 of FIG. 4). According to various embodiments, the processor 340 may render audio information based on the generated posture information. Rendering may refer to, for example, changing audio information based on the posture information generated by the processor 340. According to an embodiment, the three-dimensional sound service may refer to forming a virtual sound source, that is, a sound image that allows the listener to feel as if the sound source exists at a designated location when audio information is output by the wearable device 400. According to an embodiment, the processor 340 may render audio information together with information for adjusting the sound output based on the posture information, and may give the listener the effect that the sound source is located in a particular virtual location. According to an embodiment, the processor 340 may render audio information in order to give the listener, who receives the three-dimensional sound service through the wearable device 400, the effect that a sound image is to be formed at the electronic device 300 or at a designated location with respect to the electronic device 300. According to an embodiment, the processor 340 may transmit the rendered audio information to the wearable device 400.

Figure 8:
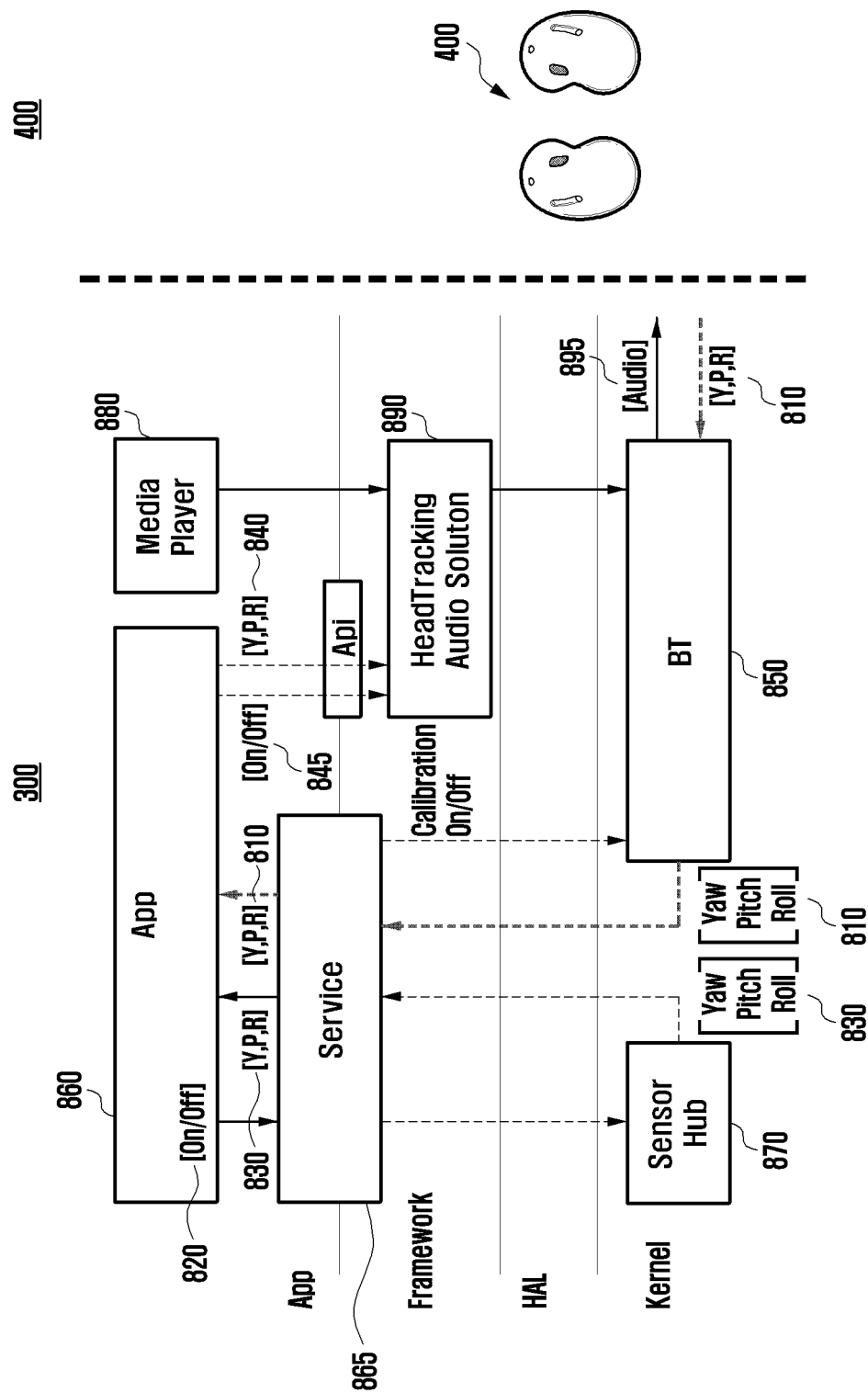
FIG. 8 illustrates functional elements and information flow of an electronic device for measuring a user's posture according to an embodiment.

FIG. 8 illustrates functional elements and information flow of an electronic device for measuring a user's posture according to an embodiment.

Referring to FIG. 8, the electronic device 300 may receive rotation angle information (e.g., second rotation angle information 810) of the wearable device 400 from the wearable device by using a Bluetooth communication module 850 (e.g., the short-range communication module 310 of FIG. 3). According to an embodiment, the received second rotation angle information may be transmitted to an application 860 via a service module 865. According to an embodiment, a sensor module 870 may generate rotation angle information (e.g., first rotation angle information 830) of the electronic device 300, and the first rotation information 830 generated by the sensor module 870 may be transmitted to the application 860 through the service module 865. The application 860 may be, for example, an application for providing the three-dimensional sound service. According to an embodiment, the application 860 may generate a control signal 820 for the sensor module 870 and transmit the control signal to the service module 865. The service module 865 may control the sensor module 870 based on the control signal 820 received from the application 860. According to an embodiment, the application 860 may generate posture information 840 based on the received first rotation angle information 830 and second rotation angle information 810. According to an embodiment, the application 860 may correct the second rotation angle information 810 and generate the posture information 840 based on the corrected second rotation angle information 810. According to an embodiment, the application 860 may transmit the generated posture information 840 to a three-dimensional sound module 890. According to an embodiment, the application 860 may transmit an activation control signal 845 to the three-dimensional sound module 890 to control the activation of the three-dimensional sound service. The activated three-dimensional sound module 890 may render audio information, which is received from a media playback module 880, based on the received posture information 840 and transmit the rendered audio information to the Bluetooth (BT) communication module 850. According to an embodiment, the Bluetooth communication module 850 may transmit the rendered audio information 895 to the wearable device 400.

Figure 9:
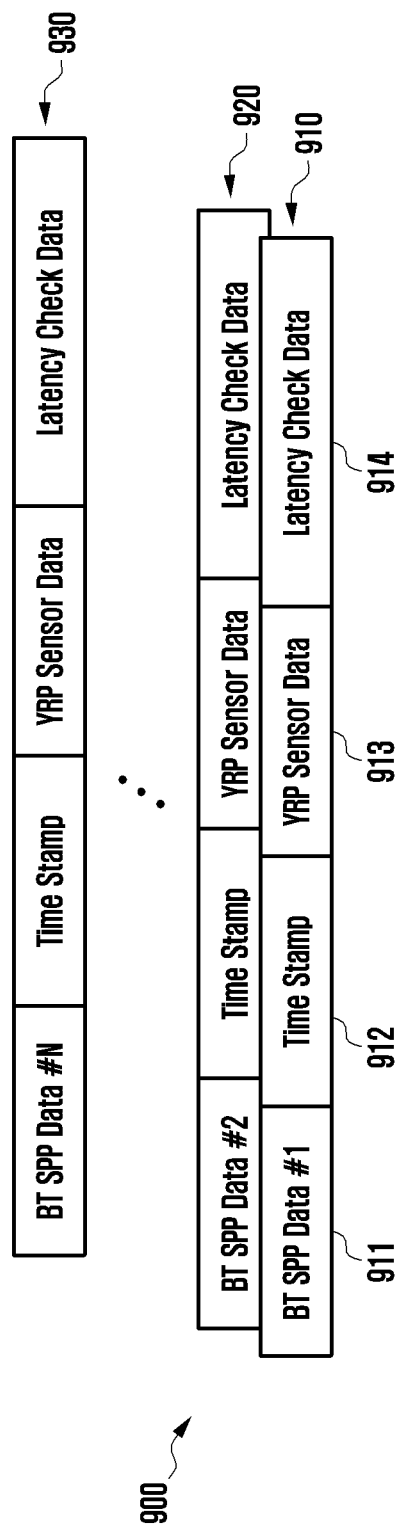
FIG. 9 is an exemplary diagram of SPP message data according to an embodiment.

FIG. 9 is an exemplary diagram of an SPP message data according to an embodiment.

According to an embodiment disclosed herein, a wearable device (e.g., the wearable device 400 of FIG. 4) may be connected to an electronic device (e.g., the electronic device 300 of FIG. 3) by using a wireless communication network (e.g., the wireless communication network 230 of FIG. 2), and may transmit a signal for controlling wireless communication in order to initiate or maintain wireless communication. According to an embodiment, the wearable device 400 may control wireless communication, and may include various pieces of data including rotation angle information of the wearable device 400 in one transmission unit (e.g., a packet) and transmit the same. According to an embodiment, the wireless communication performed by the wearable device 400 together with the electronic device 300 may be Bluetooth communication, and the wearable device 400 may generate a serial port profile (SPP) message 900 for controlling Bluetooth communication. According to an embodiment, the SPP message 900 may include Bluetooth SPP data (BT SPP Data) 911, a time stamp 912, second rotation angle information 913, and latency check data (e.g., sequence information) 914 in one packet. According to an embodiment, the time stamp 912 may be information of a recorded system time when the SPP message 900 is transmitted, received, and/or processed. According to an embodiment, the time stamp 912 may be updated or configured in the electronic device 300 or the wearable device 400, and may be updated or changed when the SPP message 900 is transmitted/received between devices or between functional elements within the same device. According to an embodiment, the second rotation angle information 913 may be information generated from a sensor of the wearable device 400 (e.g., the sensor 420 of FIG. 4). The second rotation angle information may be, for example, information regarding the rotation angle of the wearable device 400 indicating the degree of rotation of the wearable device 400. According to an embodiment, the processor 440 may generate angular velocity information, acceleration information, and/or position information of the wearable device 400 by controlling the sensor 420, and may combine and/or compute the generated angular velocity information, acceleration information, and/or position information to generate rotation angle information (e.g., second rotation angle information) of the wearable device 400. The rotation angle information may be information indicating the degree at which the wearable device 400 rotates with reference to virtual three-dimensional coordinates. The rotation angle information may be expressed as an angle, and the virtual three-dimensional coordinates may be formed with reference to at least a partial area of the wearable device 400. The rotation angle information may include at least three types of rotation angles (e.g., R value, P value, and Y value) configuring three dimensions. According to an embodiment, the latency check data may be information for used identifying a delay time between the receiving of data (e.g., second rotation angle information) and then the processing of the received data (e.g., second rotation angle information). According to an embodiment, there is a possibility that a delay may occur depending on the actual system implementation, from the point in time when the electronic device 300 receives the second rotation angle information by using the short-range communication module 310 to the point in time when the second rotation angle information reaches a functional element (e.g., the application 860 of FIG. 8) configured to correct the received second rotation angle information. Alternatively, a delay time may occur from the point in time when the second rotation angle information is received to the point in time when the processor 340 corrects the received second rotation angle information. In this case, latency check data may be used to identify the delay time that has occurred. According to an embodiment, the latency check data may be information for identifying a time delay taken for data transmission between two devices (e.g., the electronic device 300 and the wearable device 400). According to an embodiment, the latency check data may be information required to calculate a delay time taken for data from each functional element (e.g., the BT 850 in FIG. 8) of the electronic device 300 to reach another functional element (e.g., the application 860 in FIG. 8) thereof. For example, the latency check data may be unique information associated with specific data transmitted at a specific time point in the plurality of second rotation angle information transmitted in real time. According to an embodiment, the latency check data 914 may be unique data relating to one data transmission unit (e.g., a packet) transmitted by the wearable device 400. According to an embodiment, the latency check data may be check data uniquely assigned to the second rotation angle information. According to an embodiment, the processor 340 may receive check data (e.g., latency check data) uniquely assigned to the second rotation angle information. When predetermined two packets include the identical latency check data, the processor may recognize that the two packets include the same data. The information related to the posture of the wearable device 400 may be, for example, second rotation angle information 913, and the second rotation angle information 913 may include information regarding the rotation angle with reference to the three-dimensional coordinates of the wearable device 400 (e.g., yaw-pitch-roll (YPR) information). The latency check data 914 may be, for example, information (e.g., sequence information) regarding the sequence of signals (e.g., SPP message 900) and/or information transmitted by the wearable device 400 to the electronic device 300. According to an embodiment, the processor 440 of the wearable device 400 may receive a signal (e.g., an SPP message 900) for controlling a wireless connection with the electronic device 300, a time stamp 912 related to transmission, reception, or processing times of the SPP message 900, and YPR data (e.g., second rotation angle information 913) and latency check data 914 of the wearable device 400, by including the same in the same transmission unit (packet). According to an embodiment, different SPP messages (e.g., a first message 910, a second message 920, and/or a third message 930) may be sequentially and/or periodically generated from the wearable device 400 and transmitted to the electronic device 300, and may include different pieces of latency check data. The electronic device 300 may identify whether the SPP messages correspond to the identical SPP data by using latency check data. According to an embodiment, the wearable device 400 may transmit the generated SPP message 900 to the electronic device 300.

Figure 10:
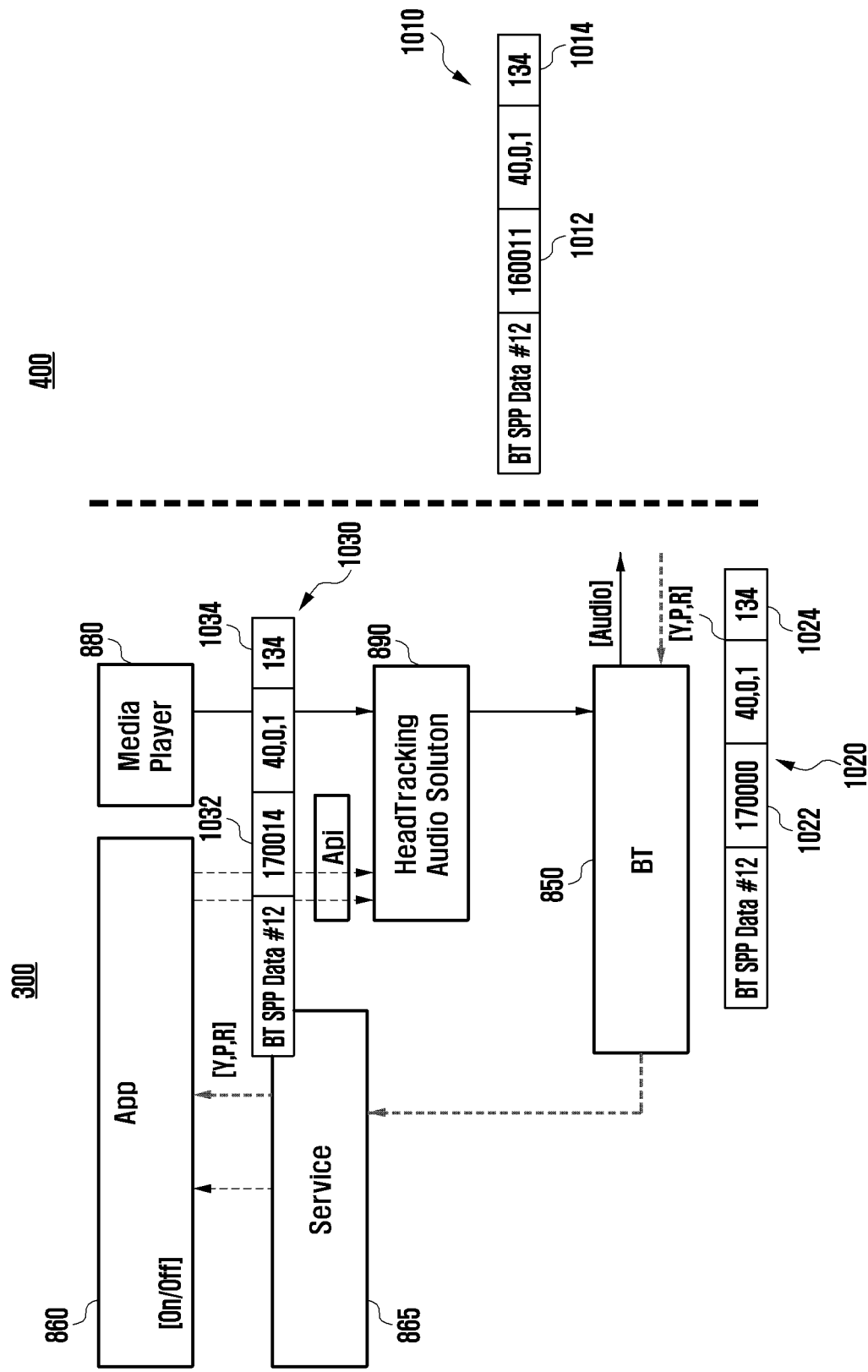
FIG. 10 is an exemplary diagram in which an electronic device calculates a delay time according to an embodiment.

FIG. 10 is an exemplary diagram in which an electronic device calculates a delay time according to an embodiment.

Referring to FIG. 10, the wearable device 400 may generate an SPP message 1010 and transmit the SPP message to the electronic device 300. According to an embodiment, the wearable device 400 may include an initial time stamp 1012 and latency check data 1014 in the SPP message 1010. According to an embodiment, the initial time stamp 1012 may be configured with reference to the system time of the wearable device 400, and for example, the system time of the wearable device 400 when transmission to the electronic device 300 occurs. According to an embodiment, the latency check data 1014 included in the designated SPP message 1010 may include unique latency check data. According to an embodiment, the time stamp of the SPP message 1020 transmitted to the electronic device 300 may be updated. For example, at a time when the Bluetooth communication module 850 of the electronic device 300 receives the SPP message 1010 transmitted by the wearable device 400, the electronic device 300 may configure the first time stamp 1022. The SPP message 1020 including the first time stamp 1022 may maintain latency check data 1024 as it is, and it is identified that the SPP message 1020 is identical to the SPP message 1010 transmitted from the wearable device 400 by using the identicalness of the latency check data. According to an embodiment, with regard to an SPP message 1030 transmitted to the application 860 through the service module 865, the electronic device 300 may configure a second time stamp 1032 at a time when the SPP message is transmitted to the application 860 or a time when the second rotation angle information is corrected. According to an embodiment, the electronic device 300 may identify the identical SPP messages 1020 and 1030 by using the identical latency check data 1024 and 1034, and may compare the first time stamp 1022 and the second time stamp 1032 between the identical SPP messages to calculate a delay time. According to an embodiment, the delay time may be calculated as the difference between the second time stamp 1032 and the first time stamp 1022. According to an embodiment, the application 860 may correct the second rotation angle information based on the calculated delay time.

Figure 11:
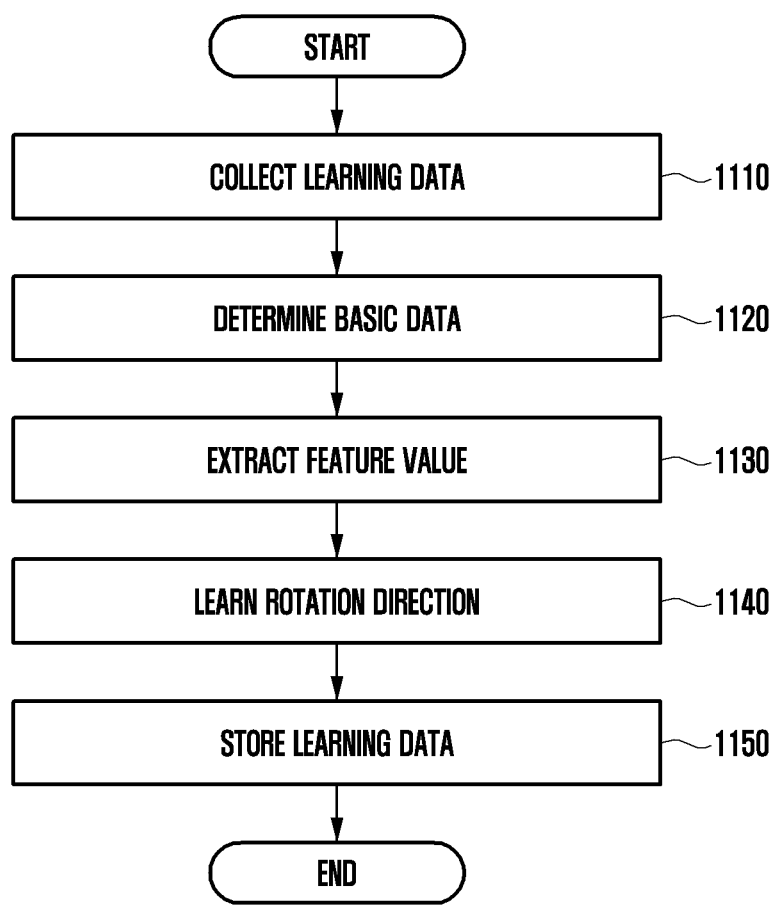
FIG. 11 is a flowchart illustrating an operation in which an electronic device learns a user movement pattern according to an embodiment.

FIG. 11 is a flowchart illustrating an operation in which an electronic device learns a user movement pattern according to an embodiment.

An operation in which the electronic device (e.g., the electronic device 101 of FIG. 1, the electronic device 210 of FIG. 2, and/or the electronic device 300 of FIG. 3) learns a user movement pattern may be described as operations of the processor (e.g., the processor 340 of FIG. 3) included in the electronic device 300. According to an embodiment, the operation of learning the user movement pattern may be understood as the operation of learning a pattern with respect to the rotation direction of the wearable device (e.g., the wearable device 220 of FIG. 2 and/or the wearable device 400 of FIG. 4). According to an embodiment, the processor 340 may learn a pattern with respect to the rotation direction of the wearable device 400. The pattern with respect to the rotation direction may refer to, for example, a rotation direction of the wearable device 400 calculated in response to rotation angle information (e.g., second rotation angle information).

Referring to operation 1110, the processor 340 may collect learning data, that is, information regarding a rotation state. According to an embodiment, the information regarding the rotation state may include a stationary state, a rotation state, a left/right rotation state, an up/down rotation state, or a combination thereof. The learning data may be, for example, information regarding various states of the user's head as a result of the rotation. According to an embodiment, the learning data may be information calculated using rotation angle information (e.g., first rotation angle information or second rotation angle information) or information regarding rotation states stored in advance in a memory (e.g., the memory 330 of FIG. 3). According to an embodiment, the processor 340 may store the collected learning data in at least a partial area of the memory 330.

Referring to operation 1120, the processor 340 may determine basic data. According to an embodiment, the processor 340 may determine basic data that serves as a basis for learning the rotation direction pattern. The basic data may be, for example, a sensor value of the wearable device 400, received from the wearable device 400. According to an embodiment, the processor 340 may receive, from the wearable device 400, an acceleration value generated by an acceleration sensor (e.g., the acceleration sensor 421 of FIG. 4) and an angular velocity value generated by a gyro sensor (e.g., the gyro sensor 422 of FIG. 4) of the wearable device 400 and store the same. The basic data determined by the processor 340 may include the acceleration value and angular velocity value of the wearable device 400. According to an embodiment, the basic data may include a pre-stored rotation-enabling range, a system environment of the electronic device 300, an operation mode of the processor 340, or a type of an application being executed by the processor 340.

Referring to operation 1130, the processor 340 may extract a feature value. According to an embodiment, the processor 340 may extract a vector direction, which serves as the feature value of a rotation direction pattern and rotation angle information (e.g., a second rotation angle information) of the wearable device 400, based on an acceleration value and an angular velocity value determined as basic data. According to an embodiment, the processor 340 may receive the second rotation angle information from the wearable device 400, and may store the received second rotation angle information as a feature value.

Referring to operation 1140, the processor 340 may learn the rotation direction based on the feature value. According to an embodiment, the processor 340 may learn the rotation direction based on the feature value extracted using an algorithm pre-stored in the memory 330 and the collected and stored learning data.

Referring to operation 1150, the processor 340 may classify the learning data, and may store information regarding the rotation direction based on the classified learning data in the memory 330. According to an embodiment, the processor 340 may correct the second rotation angle information based on the learned rotation direction data. According to an embodiment, the processor 340 may identify the rotation direction based on the learned data and the second rotation angle information. After identification of the rotation direction, the processor 340 may correct the second rotation angle information by using a rotation-enabling range corresponding to the rotation direction and/or a delay time.

Figure 12:
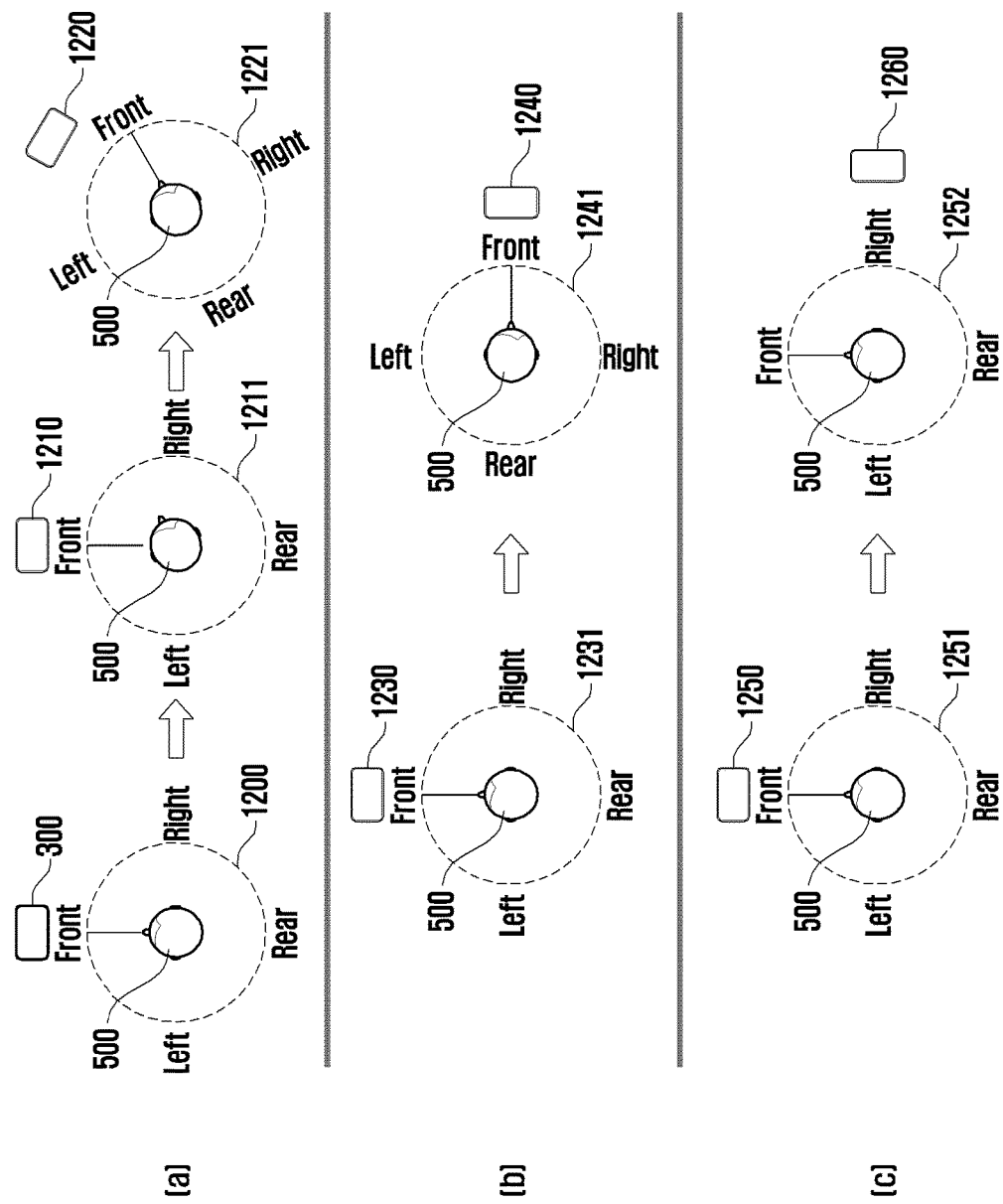
FIG. 12 is an exemplary diagram in which an electronic device provides a three-dimensional sound service according to an embodiment.

FIG. 12 is an exemplary diagram in which an electronic device provides a three-dimensional sound service according to an embodiment.

Referring to FIG. 12, according to an embodiment, the electronic device 300 may use posture information in order to provide the three-dimensional sound service. According to an embodiment, when rendering the audio information, the electronic device 300 may render the audio information based on the generated posture information, or may render audio information based on a default value (stationary state) without using the posture information. According to an embodiment, the electronic device 300 may determine whether to provide the three-dimensional sound service or whether the three-dimensional sound service is required, by using the posture information.

When the electronic device 300 provides the three-dimensional sound service, it may be classified into three examples based on the rotation of the electronic device 300 and the rotation of the user's head (e.g., rotation of the wearable device). Referring to [a] of FIG. 12, when only the user (e.g., the user's head 500) rotates and the electronic device 300 is maintained at a first position 1210 in which the electronic device is first placed, the electronic device 300 provides the three-dimensional sound service, and thus the sound image may maintain the same second sound image 1211 as the existing first sound image 1200. According to an embodiment, the three-dimensional sound service may be performed by changing the sound image with reference to in front of the user's head 500 and maintaining the sound image with reference to the location of the electronic device 300. However, when the electronic device 300 rotates substantially simultaneously with the user's head and is changed to the second position 1220, the three-dimensional sound service may be changed to output the sound image 1221 where the sound source is still in front, but is not directly in front, with reference to the user's posture.

Referring to [b] of FIG. 12, when the user's head 500 and the electronic device 300 rotate substantially simultaneously, the electronic device 300 rotates from a third position 1230 to a fourth position 1240. However, the user's posture (e.g., the direction of the user's head 500) is also changed in the same manner, and thus the three-dimensional sound service may not be provided. In this case, the sound image may also be changed from the third sound image 1231 to a fourth sound image 1241 in the same manner as the user's posture (e.g., the direction of the user's head 500), but the electronic device 300 may transmit the same audio information to the wearable device 400 regardless of the posture information.

Referring to [c] of FIG. 12, when only the electronic device 300 rotates, the three-dimensional sound service may not be provided. When only the electronic device 300 rotates while the user's posture (e.g., the user's head 500) is stationary, the user (e.g., the user's head 500) may feel confused due to the sound image being changed even though the user is stationary. In this case, even though the electronic device 300 rotates from a fifth position 1250 to a sixth position 1260 without changing the sound image, the fifth sound image 1251 and the sixth sound image 1252 can be maintained to identically face the front of the user.

Figure 13:
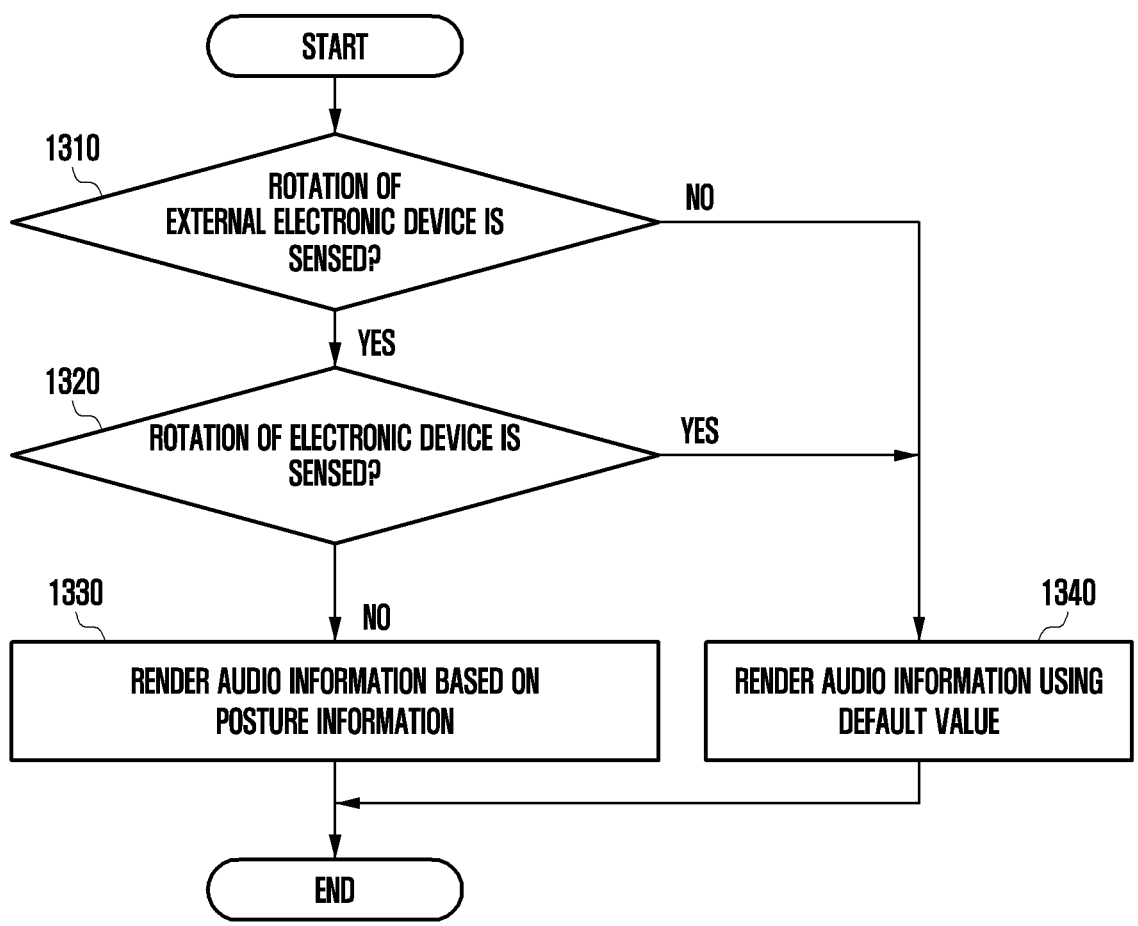
FIG. 13 is a flowchart illustrating an operation in which an electronic device provides a three-dimensional sound service according to an embodiment.

FIG. 13 is a flowchart illustrating an operation in which an electronic device provides a three-dimensional sound service according to an embodiment.

Referring to FIG. 13, an operation, in which an electronic device (e.g., the electronic device 101 of FIG. 1, the electronic device 210 of FIG. 2, and/or the electronic device 300 of FIG. 3) provides the three-dimensional sound service, may be described as each operations performed by the processor 340 included in the electronic device 300.

According to an embodiment, the processor 340 may use posture information to provide the three-dimensional sound service. According to an embodiment, when rendering audio information, the processor 340 may render the audio information based on the generated posture information, or may render the audio information based on a default value (stationary state) without using the posture information. According to an embodiment, the processor 340 may determine whether to provide the 3D sound service or whether the 3D sound service is required, by using the posture information.

Referring to operation 1310, the processor 340 sense whether an external electronic device (e.g., the wearable device 400 of FIG. 4) is rotated. According to an embodiment, the posture information may be generated based on rotation angle information (e.g., first rotation angle information) of the electronic device 300 and rotation angle information (e.g., second rotation angle information) of the wearable device 400. According to an embodiment, when rotation of the wearable device 400 is sensed, the processor 340 may determine that the user's movement has occurred, and may determine that it is necessary to provide the three-dimensional sound service. According to an embodiment, when rotation of the wearable device 400 is sensed, the processor 340 may render audio information based on the posture information. When rotation of the wearable device 400 is sensed, the processor 340 may proceed to operation 1320. Alternatively, when the rotation of the wearable device 400 is not sensed, the processor 340 may proceed to operation 1340.

Referring to operation 1320, the processor 340 may sense whether the electronic device 300 is rotated. According to an embodiment, when the rotation of the electronic device 300 is sensed substantially simultaneously with the rotation of the wearable device 400, the processor 340 may determine that there is no need to provide the three-dimensional sound service. According to an embodiment, when the electronic device 300 rotates substantially simultaneously with the wearable device 400, the electronic device 300 may move together with the user. In this case, it may not be necessary to provide a three-dimensional sound service. Alternatively, when the rotation of the electronic device 300 occurs substantially simultaneously with the rotation of the wearable device 400, there is a risk that the three-dimensional sound service causes confusion to a user who is listening and thus, the processor 340 may stop providing the three-dimensional sound service. When the rotation of the electronic device 300 is not sensed, the processor 340 proceeds to operation 1330. Alternatively, when the rotation of the electronic device 300 is sensed, the processor 340 may proceed to operation 1340.

Referring to operation 1330, the processor 340 may render audio information based on the posture information. According to an embodiment, when the rotation of the wearable device 400 is sensed and when the rotation of the electronic device 300 is not sensed, the processor 340 may render audio information by using the generated posture information.

Referring to operation 1340, the processor 340 may render audio information using a default value. According to an embodiment, when it is determined that the three-dimensional sound service is unnecessary, that is, when the rotation of the wearable device 400 is not sensed or when the rotation of the electronic device 300 occurs substantially simultaneously with the rotation of the wearable device 400, the processor 340 may render or not the audio information using a preset default value, without rendering the audio information based on the posture information.

The electronic device 300 according to an embodiment disclosed herein may include a sensor 320, a short-range communication module 310 configured to perform short-distance communication with an external electronic device; and a processor 340 operatively connected to the short-range communication module 310, wherein the processor 340 is configured to generate first rotation angle information by using the sensor 320, establish a connection to the external electronic device by using the short-range communication module 310, receive, from the external electronic device, second rotation angle information and check data uniquely assigned to the second rotation angle information, configure a first time stamp based on the check data and a time of receiving the second rotation angle information, configure a second time stamp based on the check data and a time of correcting the second rotation angle information, compare the first time stamp and the second time stamp to calculate a delay time from the time of receiving the second rotation angle information to the time of correcting the second rotation angle information, correct the second rotation angle information based on the delay time, and generate posture information based on the first rotation angle information and the corrected second rotation angle information.

Further, the processor 340 may be configured to render audio information based on the posture information, and transmit the rendered audio information to the external electronic device.

Further, the processor 340 may be configured to render the audio information based on the posture information when only rotation of the external electronic device is sensed, and render the audio information using a preset default value of the audio information when rotation of the electronic device 300 is sensed together with the rotation of the external electronic device.

In addition, the second rotation angle information includes a yaw value, a pitch value, and a roll value representing rotation angles of the external electronic device, and the processor may be configured to generate a variance in the rotation angles of the external electronic device.

In addition, the processor 340 may be configured to calculate a correction value for the second rotation angle information based on the calculated delay time and the variance in the rotation angles of the external electronic device, and correct the second rotation angle information by applying the calculated correction value to the second rotation angle information.

In addition, the electronic device may further include a memory 330 operatively connected to the processor 340, wherein the processor 340 is configured to identify context information, store the delay time corresponding to the context information in the memory 330, identify the delay time based on the stored context information, and correct the second rotation angle information based on the identified delay time.

In addition, wherein the context information includes the type of an application being executed by the processor and a data processing mode of the processor 340.

In addition, the electronic device may further include a memory 330 operatively connected to the processor 340, wherein the processor 340 is configured to learn a rotation direction pattern of the external electronic device based on the second rotation angle information, using a learning algorithm stored in the memory, and store pattern information regarding the rotation direction pattern in the memory 330.

In addition, the electronic device may further include a memory 330 operatively connected to the processor 340, wherein the processor 340 is configured to calculate a rotation direction of the external electronic device based on the second rotation angle information, identify rotation-enabling range information corresponding to the rotation direction pre-stored in the memory 330, and correct the second rotation angle information based on the rotation-enabling range information.

In addition, the processor 340 may be configured to detect multiple short-range wireless signals, which are output from multiple components of the external electronic device, by using the sensor 320, measure distances between each of the multiple components of the external electronic device and the electronic device, based on the detected multiple short-range wireless signals, and correct the second rotation angle information based on the measured distances between each of the multiple components of the external electronic device and the electronic device.

A method for providing three-dimensional sound by an electronic device 300 according to an embodiment disclosed herein may include: generating first rotation angle information; establishing a connection to an external electronic device; receiving second rotation angle information and check data uniquely assigned to the second rotation angle information from the external electronic device; configuring a first time stamp based on a time of receiving the second rotation angle information and the check data; configuring a second time stamp based on a time of correcting the second rotation angle information and the check data; comparing the first time stamp and the second time stamp to calculate a delay time from the time of receiving the second rotation angle information to the time of correcting the second rotation angle information; correcting second rotation angle information based on the delay time; and generating posture information based on the first rotation angle information and the corrected second rotation angle information.

Further, the method may further include rendering audio information based on the posture information, and transmitting the rendered audio information to the external electronic device.

Further, the rendering of the audio information may include rendering the audio information based on the posture information when only rotation of the external electronic device is sensed, and rendering the audio information using a preset default value of the audio information when rotation of the electronic device is detected together with the rotation of the external electronic device.

Further, the second rotation angle information may include a yaw value, a pitch value, and a roll value representing rotation angles of the external electronic device, and the method may further include generating a variance in the rotation angles of the external electronic device.

In addition, the correcting of second rotation angle information may further include calculating a correction value for the second rotation angle information based on the calculated delay time and the variance in the rotation angles of the external electronic device, and applying the calculated correction value to the second rotation angle information to correct the second rotation angle information.

In addition, the method may include identifying context information, storing the delay time corresponding to the context information, identifying the delay time based on the stored context information, and correcting the second rotation angle information based on the identified delay time.

In addition, the method may include learning a rotation direction pattern of the external electronic device based on the second rotation angle information, by using a pre-stored learning algorithm, and storing pattern information regarding the rotation direction pattern.

In addition, the method may include calculating a rotation direction of the external electronic device based on the second rotation angle information, identifying rotation-enabling range information corresponding to the rotation direction, and correcting the second rotation angle information based on the rotation-enabling range information.

An electronic device 400 according to various embodiments disclosed herein may include: a short-range communication module 410 configured to perform short-distance communication with an external electronic device; a sensor 420 for sensing a rotation angle of the electronic device 400; and a processor 440 operatively connected to the short-range communication module 410 and the sensor 420, wherein the processor 440 is configured to generate rotation angle information regarding the rotation angle of the electronic device 400, by using the sensor, generate check data uniquely assigned to the rotation angle information in response to generating the rotation angle information, and transmit the rotation angle information and the check data to the external electronic device by using the short-range communication module 410.

In addition, the electronic device may further include speaker 430 operatively connected to the processor 440, wherein the processor 440 is configured to receive audio information from the external electronic device by using the short-range communication module 410, and output a sound to the speaker 430 based on the audio information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

The invention claimed is:

1. An electronic device comprising:
   a sensor;
   a short-range communication module configured to perform short-distance communication with an external electronic device; and
   a processor operatively connected to the short-range communication module,
   wherein the processor is configured to:
      generate first rotation angle information by using the sensor,
      establish a connection to the external electronic device by using the short-range communication module,
      receive, from the external electronic device, second rotation angle information and check data uniquely assigned to the second rotation angle information,
      configure a first time stamp based on the check data and a time of receiving the second rotation angle information,
      configure a second time stamp based on the check data and a time of correcting the second rotation angle information,
      compare the first time stamp and the second time stamp to calculate a delay time from the time of receiving the second rotation angle information to the time of correcting the second rotation angle information,
      correct the second rotation angle information based on the delay time, and
      generate posture information based on the first rotation angle information and the corrected second rotation angle information.

2. The electronic device of claim 1, wherein the processor is configured to render audio information based on the posture information, and transmit the rendered audio information to the external electronic device.

3. The electronic device of claim 2, wherein the processor is configured to render the audio information based on the posture information when only rotation of the external electronic device is sensed, and render the audio information using a preset default value of the audio information when rotation of the electronic device is sensed together with the rotation of the external electronic device.

4. The electronic device of claim 1, wherein the second rotation angle information includes a yaw value, a pitch value, and a roll value representing rotation angles of the external electronic device.

5. The electronic device of claim 1, wherein the processor is configured to:
   generate information associated with a variance in the rotation angles of the external electronic device,
   calculate a correction value for the second rotation angle information based on the calculated delay time and the variance in the rotation angles of the external electronic device, and
   correct the second rotation angle information by applying the calculated correction value to the second rotation angle information.

6. The electronic device of claim 1, further comprising a memory operatively connected to the processor,
   wherein the processor is configured to:
      identify context information,
      store the delay time corresponding to the context information in the memory,
      identify the delay time based on the stored context information, and
      correct the second rotation angle information based on the identified delay time.

7. The electronic device of claim 6, wherein the context information includes a type of an application being executed by the processor and a data processing mode of the processor.

8. The electronic device of claim 1, further comprising a memory operatively connected to the processor,
   wherein the processor is configured to:
      learn a rotation direction pattern of the external electronic device based on the second rotation angle information, using a learning algorithm stored in the memory, and
      store pattern information regarding the rotation direction pattern in the memory.

9. The electronic device of claim 1, further comprising a memory operatively connected to the processor,
   wherein the processor is configured to:
      calculate a rotation direction of the external electronic device based on the second rotation angle information,
      identify rotation-enabling range information corresponding to the rotation direction pre-stored in the memory, and
      correct the second rotation angle information based on the rotation-enabling range information.

10. The electronic device of claim 1, wherein the processor is configured to:
   detect multiple short-range wireless signals, which are output from multiple components of the external electronic device, using the sensor,
   measure distances between each of the multiple components of the external electronic device and the electronic device, based on the detected multiple short-range wireless signals, and
   correct the second rotation angle information based on the measured distances between each of the multiple components of the external electronic device and the electronic device.

11. A method for providing three-dimensional sound by an electronic device, the method comprising:
   generating first rotation angle information;
   establishing a connection to an external electronic device;
   receiving second rotation angle information and check data uniquely assigned to the second rotation angle information from the external electronic device;

configuring a first time stamp based on a time of receiving the second rotation angle information and the check data;

configuring a second time stamp based on a time of correcting the second rotation angle information and the check data;

comparing the first time stamp and the second time stamp to calculate a delay time from the time of receiving the second rotation angle information to the time of correcting the second rotation angle information;

correcting second rotation angle information based on the delay time; and generating posture information based on the first rotation angle information and the corrected second rotation angle information.

12. The method of claim 11, further comprising:

rendering audio information based on the posture information; and transmitting the rendered audio information to the external electronic device.

13. The method of claim 12, wherein the rendering of the audio information further comprises:

rendering the audio information based on the posture information when only rotation of the external electronic device is sensed; and rendering the audio information using a preset default value of the audio information when rotation of the electronic device is sensed together with the rotation of the external electronic device.

14. The method of claim 11, wherein the second rotation angle information includes a yaw value, a pitch value, and a roll value representing rotation angles of the external electronic device.

15. The method of claim 11, wherein the correcting of second rotation angle information further comprises:

generating information associated with a variance in the rotation angles of the external electronic device;

calculating a correction value for the second rotation angle information based on the calculated delay time and the variance in the rotation angles of the external electronic device; and applying the calculated correction value to the second rotation angle information to correct the second rotation angle information.

16. The method of claim 11, comprising:
identifying context information;
storing the delay time corresponding to the context information;
identifying the delay time based on the stored context information; and
correcting the second rotation angle information based on the identified delay time.

17. The method of claim 11, comprising:

learning a rotation direction pattern of the external electronic device based on the second rotation angle information, by using a pre-stored learning algorithm; and storing pattern information regarding the rotation direction pattern.

18. The method of claim 11, comprising:

calculating a rotation direction of the external electronic device based on the second rotation angle information;

identifying rotation-enabling range information corresponding to the rotation direction; and correcting the second rotation angle information based on the rotation-enabling range information.

19. An electronic device comprising:

a short-range communication module configured to perform short-distance communication with an external electronic device;

a sensor for sensing a rotation angle of the electronic device; and a processor operatively connected to the short-range communication module and the sensor, wherein the processor is configured to:
generate rotation angle information regarding the rotation angle of the electronic device, by using the sensor,
generate check data uniquely assigned to the rotation angle information in response to generating the rotation angle information, and
transmit the rotation angle information and the check data to the external electronic device by using the short-range communication module.

20. The electronic device of claim 19, further comprising a speaker operatively connected to the processor, wherein the processor is configured to:
receive audio information from the external electronic device by using the short-range communication module, and
output sound to the speaker based on the audio information.

* * * * *